United States Patent
Miyata et al.

(10) Patent No.: US 12,513,271 B2
(45) Date of Patent: Dec. 30, 2025

(54) INFORMATION PROCESSING APPARATUS, INFORMATION PROCESSING METHOD, AND PROGRAM FOR DECIDING LINE-OF-SIGHT DIRECTION OF VIRTUAL VIEWPOINT

(71) Applicant: FUJIFILM Corporation, Tokyo (JP)

(72) Inventors: Masahiko Miyata, Saitama (JP); Takashi Aoki, Saitama (JP); Fuminori Irie, Saitama (JP); Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 36 days.

(21) Appl. No.: 17/866,548

(22) Filed: Jul. 17, 2022

(65) Prior Publication Data

US 2022/0353484 A1 Nov. 3, 2022

Related U.S. Application Data

(63) Continuation of application No. PCT/JP2020/042158, filed on Nov. 11, 2020.

(30) Foreign Application Priority Data

Jan. 22, 2020 (JP) .................. 2020-008731

(51) Int. Cl.
 *H04N 11/02* (2006.01)
 *G06T 7/70* (2017.01)
 (Continued)

(52) U.S. Cl.
 CPC .............. *H04N 13/111* (2018.05); *G06T 7/70* (2017.01); *G06V 10/22* (2022.01); *G06V 20/41* (2022.01);
 (Continued)

(58) Field of Classification Search
 CPC ...................................... H04N 13/111
 (Continued)

(56) References Cited

U.S. PATENT DOCUMENTS 7,185,283 B1 * 2/2007 Takahashi ............... G11B 27/34 386/E5.001
9,393,961 B1 * 7/2016 Templeton ................ G06T 7/77
(Continued)

FOREIGN PATENT DOCUMENTS

JP H09186951 7/1997
JP 2000285260 10/2000
(Continued)

OTHER PUBLICATIONS

"International Search Report (Form PCT/ISA/210) of PCT/JP2020/042158," mailed on Feb. 2, 2021, with English translation thereof, pp. 1-6.
(Continued)

*Primary Examiner* — Leron Beck
(74) *Attorney, Agent, or Firm* — JCIPRNET

(57) ABSTRACT

An information processing apparatus includes a processor and a memory connected to or incorporated in the processor. The processor evaluates an imaging target region from a plurality of line-of-sight directions on the basis of one or more evaluation items by using a plurality of images obtained by imaging the imaging target region with a plurality of imaging devices having different viewpoints, and decides a line-of-sight direction of a virtual viewpoint, which is used to generate a virtual viewpoint video, on the basis of an evaluation result.

19 Claims, 21 Drawing Sheets

(51) Int. Cl.
*G06V 10/22* (2022.01)
*G06V 20/40* (2022.01)
*H04N 13/111* (2018.01)

(52) U.S. Cl.
CPC ............... *G06T 2207/10016* (2013.01); *G06T 2207/10032* (2013.01)

(58) Field of Classification Search
USPC .......................................................... 348/48
See application file for complete search history.

(56) References Cited

U.S. PATENT DOCUMENTS

| | | | |
|---|---|---|---|
| 2005/0187015 A1* | 8/2005 | Suzuki .................... A63F 13/26 | 463/32 |
| 2007/0067724 A1* | 3/2007 | Takahashi ............ G11B 27/031 | 348/E5.051 |
| 2012/0033077 A1* | 2/2012 | Kitaura ..................... G06T 7/55 | 348/148 |
| 2012/0268571 A1* | 10/2012 | Debevec .................. G06T 7/586 | 348/48 |
| 2014/0152764 A1* | 6/2014 | Kira ................... G01C 21/3647 | 348/36 |
| 2014/0340543 A1 | 11/2014 | Nakada et al. | |
| 2016/0299505 A1* | 10/2016 | Ohara ................... B25J 11/0005 | |
| 2017/0039746 A1* | 2/2017 | Mizoguchi ........... G06V 10/772 | |
| 2017/0142486 A1 | 5/2017 | Masuda | |
| 2017/0287222 A1* | 10/2017 | Fujimaki ................. G06F 3/017 | |
| 2018/0295389 A1 | 10/2018 | Kakurai | |
| 2018/0302610 A1 | 10/2018 | Masuda et al. | |
| 2018/0332218 A1* | 11/2018 | Yoshimura ............. H04N 23/90 | |
| 2018/0359458 A1* | 12/2018 | Iwakiri ................. G06T 15/205 | |
| 2019/0068945 A1* | 2/2019 | Maruyama .......... A63F 13/5255 | |
| 2019/0132529 A1 | 5/2019 | Ito | |
| 2019/0199992 A1* | 6/2019 | Shikata ..................... G06T 7/70 | |
| 2019/0228230 A1* | 7/2019 | Onuma ............. H04N 21/2187 | |
| 2019/0287302 A1 | 9/2019 | Bhuruth | |
| 2019/0289275 A1* | 9/2019 | Arai ........................ H04N 23/60 | |
| 2020/0021761 A1* | 1/2020 | Tanaka ................. H04N 13/117 | |
| 2020/0066028 A1* | 2/2020 | Umemura ............ H04N 13/111 | |
| 2020/0084431 A1* | 3/2020 | Kato ....................... G06T 19/00 | |
| 2021/0099734 A1 | 4/2021 | Kawanishi et al. | |
| 2022/0353484 A1 | 11/2022 | Miyata et al. | |

FOREIGN PATENT DOCUMENTS

| | | |
|---|---|---|
| JP | 2014225843 | 12/2014 |
| JP | 2018182428 | 11/2018 |
| JP | 2018182566 | 11/2018 |
| JP | 2019020845 | 2/2019 |
| JP | 2019083402 | 5/2019 |
| JP | 2019114147 | 7/2019 |
| JP | 2019160318 | 9/2019 |
| JP | 2019220783 | 12/2019 |
| WO | 2016009864 | 1/2016 |
| WO | 2021149336 | 7/2021 |

OTHER PUBLICATIONS

"Written Opinion of the International Searching Authority (Form PCT/ISA/237)" of PCT/ JP2020/042158, mailed on Feb. 2, 2021, with English translation thereof, pp. 1-6.
"Notice of Reasons for Refusal of Japan Counterpart Application", issued on Oct. 1, 2024, with English translation thereof, p. 1-p. 17.

* cited by examiner

FIG. 8

STORAGE (60)

T3 — SCENE: ENTRANCE

| | EVALUATION ITEM | SCORE |
|---|---|---|
| A | BALL | −5 |
| B | FACE AND LIMBS OF PLAYER CLOSEST TO BALL | −5 |

T2 — SCENE: HALF TIME

| | EVALUATION ITEM | SCORE |
|---|---|---|
| A | BALL | −5 |
| B | FACE AND LIMBS OF PLAYER CLOSEST TO BALL | −5 |

T1 — SCENE: DURING MATCH

| | EVALUATION ITEM | SCORE |
|---|---|---|
| A | BALL | +10 |
| B | FACE AND LIMBS OF PLAYER CLOSEST TO BALL | +8 |
| C | FACES AND LIMBS OF OTHER PLAYERS | +4 |
| D | REFEREE | −5 |
| E | FACE OF SPECTATOR | −2 |

FIG. 13
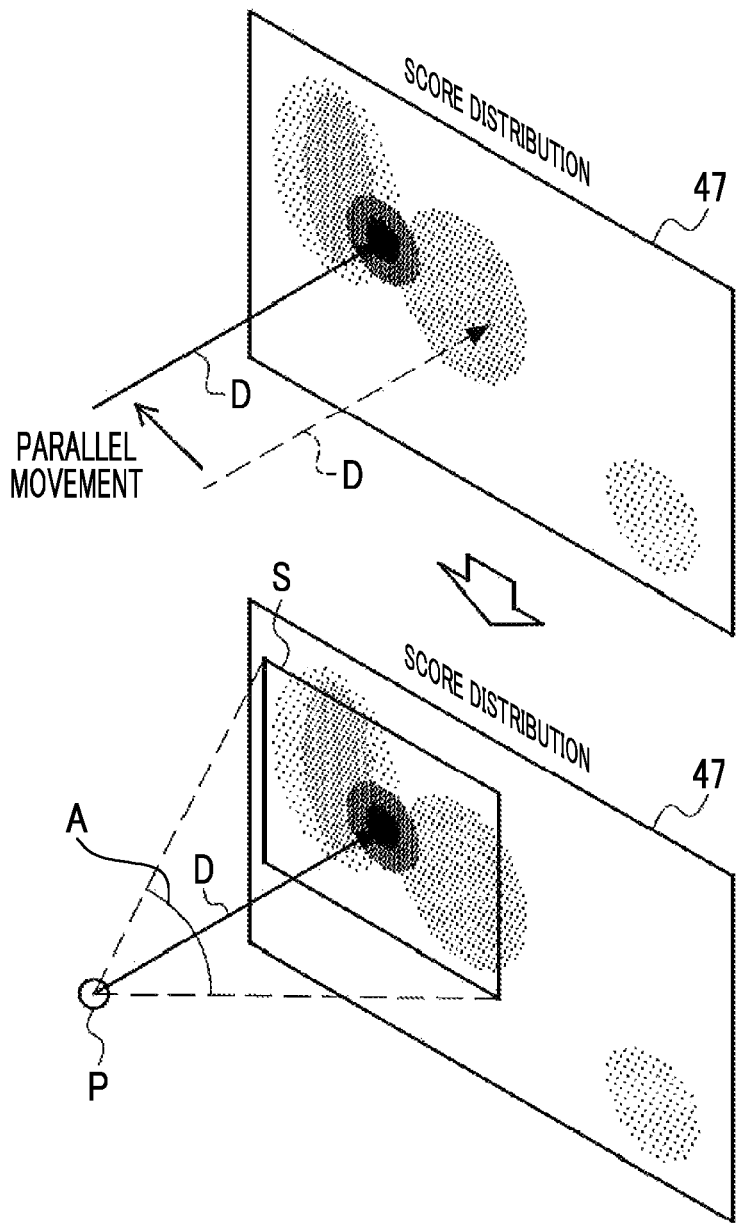
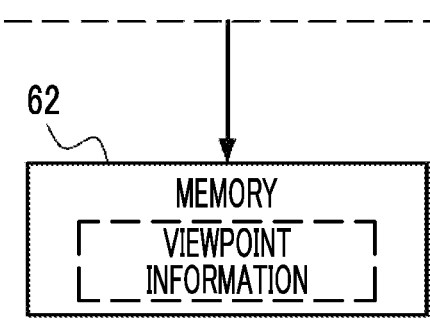

INFORMATION PROCESSING APPARATUS, INFORMATION PROCESSING METHOD, AND PROGRAM FOR DECIDING LINE-OF-SIGHT DIRECTION OF VIRTUAL VIEWPOINT

CROSS-REFERENCE TO RELATED APPLICATION

This application is a continuation application of International Application No. PCT/JP2020/042158, filed Nov. 11, 2020, the disclosure of which is incorporated herein by reference in its entirety. Further, this application claims priority from Japanese Patent Application No. 2020-008731 filed on Jan. 22, 2020, the disclosure of which is incorporated herein by reference in its entirety.

BACKGROUND

1. Technical Field

A technique of the present disclosure relates to an information processing apparatus, an information processing method, and a program.

2. Description of the Related Art

JP2018-182566A discloses a viewpoint selection support apparatus. In the viewpoint selection support apparatus disclosed in JP2018-182566A, a client terminal specifies a trajectory of a ball for a predetermined period, specifies one or more players located within a predetermined distance from a position of the ball for a predetermined time or longer in the predetermined period, and sets a range including the trajectory of the ball and trajectories of the one or more players to a range of video output, in a case where viewpoint selection support of a free viewpoint video, which acquires three-dimensional information of a space by using a plurality of cameras and generates a video from any viewpoint on the basis of the three-dimensional information, is performed.

JP2019-160318A discloses an information processing apparatus that sets a virtual viewpoint related to generation of a virtual viewpoint image. The information processing apparatus disclosed in JP2019-160318A includes: an acquisition unit that acquires viewpoint information having a plurality of virtual viewpoint parameters each of which indicates at least one of a position or a direction of a virtual viewpoint and having a plurality of virtual viewpoint parameters corresponding to a plurality of time points included in a period of imaging performed by a plurality of imaging devices; an extraction unit that extracts one or more virtual viewpoint parameters specified according to a predetermined event in an imaging region from the plurality of virtual viewpoint parameters included in the viewpoint information acquired by the acquisition unit; a reception unit that receives an input corresponding to a user operation related to a change of the virtual viewpoint parameter extracted by the extraction unit; and a setting unit that sets the virtual viewpoint related to the generation of the virtual viewpoint image on the basis of the virtual viewpoint parameter changed in response to the input received by the reception unit.

JP2019-114147A discloses an information processing apparatus. The information processing apparatus disclosed in JP2019-114147A is an information processing apparatus that decides a position of a viewpoint related to a virtual viewpoint image generated by using a plurality of images captured by a plurality of imaging devices, the information processing apparatus including: a first acquisition unit that acquires position information indicating a position in a predetermined range based on an imaging target of the plurality of imaging devices; and a decision unit that decides a position of a viewpoint related to a virtual viewpoint image for capturing the imaging target with a position different from the position indicated by the position information acquired by the first acquisition unit as a viewpoint, on the basis of the position information acquired by the first acquisition unit.

JP2019-20845A discloses an image processing apparatus. The image processing apparatus disclosed in JP2019-20845A includes a generation unit that generates a virtual viewpoint image from a plurality of images among a plurality of images output from a plurality of cameras; an acquisition unit that acquires a quality value of each of the plurality of images output from the plurality of cameras; a calculation unit that calculates a quality value of the virtual viewpoint image from quality values of the plurality of images used to generate the virtual viewpoint image; and an output unit that outputs the quality value of the virtual viewpoint image in association with the plurality of cameras which has captured the plurality of images used to generate corresponding virtual viewpoint images.

JP2019-83402A discloses an image processing apparatus. The image processing apparatus disclosed in JP2019-83402A comprises: a model acquisition unit that acquires an object three-dimensional model generated from an image obtained by capturing an object with a plurality of imaging devices disposed at different positions; a reception unit that receives designation of a virtual viewpoint; a data acquisition unit that acquires, as an image used to generate a virtual viewpoint image, an image based on imaging performed by an imaging device selected on the basis of a positional relationship between a plurality of objects imaged by the plurality of imaging devices, a position and a direction of the imaging device, and a position of the virtual viewpoint corresponding to the designation received by the reception unit; and an image generation unit that generates the virtual viewpoint image on the basis of the object three-dimensional model acquired by the model acquisition unit and the image acquired by the data acquisition unit.

JP2014-225843A discloses an image processing apparatus. The image processing apparatus disclosed in JP2014-225843A acquires a plurality of image data acquired at different angles of view and a virtual angle of view desired by a user. Then, the image processing apparatus decides a weight on the basis of the virtual angle of view and each angle of view of the plurality of image data. The image processing apparatus generates virtual angle-of-view image data corresponding to the virtual angle of view by using the decided weight and the plurality of image data.

SUMMARY

One embodiment according to the technique of the present disclosure provides an information processing apparatus, an information processing method, and a program capable of deciding a line-of-sight direction of a virtual viewpoint.

A first aspect according to the technique of the present disclosure is an information processing apparatus comprising: a processor; and a memory that is connected to or incorporated in the processor, in which the processor evaluates an imaging target region from a plurality of line-of-sight directions on the basis of one or more evaluation items by using a plurality of images obtained by imaging the imaging target region with a plurality of imaging devices having different viewpoints, and decides a line-of-sight direction of a virtual viewpoint, which is used to generate a virtual viewpoint video, on the basis of an evaluation result.

A second aspect according to the technique of the present disclosure is the information processing apparatus according to the first aspect, in which the processor decides the line-of-sight direction on the basis of the evaluation result obtained by calculating an evaluation value of the imaging target region as a numerical value.

A third aspect according to the technique of the present disclosure is the information processing apparatus according to the second aspect, in which the processor uses a score table in which a score is set for each evaluation item and the score is given in a case where a factor corresponding to the evaluation item exists, and decides a line-of-sight direction in which a total score of the scores is highest for the imaging target region, as the line-of-sight direction of the virtual viewpoint.

A fourth aspect according to the technique of the present disclosure is the information processing apparatus according to the third aspect, in which the processor decides the line-of-sight direction of the virtual viewpoint by estimating the line-of-sight direction in which the total score is highest, on the basis of a change related to the line-of-sight direction in the total score calculated for each of the plurality of images.

A fifth aspect according to the technique of the present disclosure is the information processing apparatus according to the fourth aspect, in which the processor decides a position and an angle of view of the virtual viewpoint on the basis of distribution of the scores in the imaging target region by using the line-of-sight direction of the virtual viewpoint as a reference after deciding the line-of-sight direction of the virtual viewpoint.

A sixth aspect according to the technique of the present disclosure is the information processing apparatus according to the fifth aspect, in which the processor decides the position and the angle of view of the virtual viewpoint by using, as a reference, a region where density of the scores is highest in the imaging target region.

A seventh aspect according to the technique of the present disclosure is the information processing apparatus according to the fifth or sixth aspect, in which the processor lowers the score in a case where any of the viewpoints of the plurality of imaging devices matches the virtual viewpoint.

An eighth aspect according to the technique of the present disclosure is the information processing apparatus according to any one of the third to seventh aspects, in which the processor switches a plurality of the score tables in which at least one of the evaluation item or the score is different, and decides the line-of-sight direction of the virtual viewpoint by using the switched score table.

A ninth aspect according to the technique of the present disclosure is the information processing apparatus according to the eighth aspect, in which the processor switches the score table according to a scene of the imaging target region.

A tenth aspect according to the technique of the present disclosure is the information processing apparatus according to the eighth or ninth aspect, in which the processor switches the score table on a condition that a predetermined time is passed after the score table is switched.

An eleventh aspect according to the technique of the present disclosure is the information processing apparatus according to any one of the first to tenth aspects, in which the evaluation item includes a type of an object included in the imaging target region.

A twelfth aspect according to the technique of the present disclosure is the information processing apparatus according to the eleventh aspect, in which the evaluation item includes a type of sound information collected by a microphone.

A thirteenth aspect according to the technique of the present disclosure is the information processing apparatus according to the fifth or sixth aspect, in which the processor decides the line-of-sight direction, the position, and the angle of view by referring to history information of the virtual viewpoint decided in a past.

A fourteenth aspect according to the technique of the present disclosure is the information processing apparatus according to the fifth or sixth aspect, in which the processor periodically decides the line-of-sight direction, the position, and the angle of view of the virtual viewpoint.

A fifteenth aspect according to the technique of the present disclosure is the information processing apparatus according to the fourteenth aspect, in which the processor decides the line-of-sight direction, the position, and the angle of view of the virtual viewpoint under restriction that a rate of temporal change in each of the line-of-sight direction, the position, and the angle of view of the virtual viewpoint is a default value or less.

A sixteenth aspect according to the technique of the present disclosure is the information processing apparatus according to the fifteenth aspect, in which the default value is decided according to a distance from the virtual viewpoint to an imaging target.

A seventeenth aspect according to the technique of the present disclosure is the information processing apparatus according to any one of the first to sixteenth aspects, in which the processor generates the virtual viewpoint video on the basis of virtual viewpoint information including the decided line-of-sight direction of the virtual viewpoint.

An eighteenth aspect according to the technique of the present disclosure is an information processing method comprising: evaluating an imaging target region from a plurality of line-of-sight directions on the basis of one or more evaluation items by using a plurality of images obtained by imaging the imaging target region with a plurality of imaging devices having different viewpoints; and deciding a line-of-sight direction of a virtual viewpoint, which is used to generate a virtual viewpoint video, on the basis of an evaluation result.

A nineteenth aspect according to the technique of the present disclosure is a program causing a computer to execute a process comprising: evaluating an imaging target region from a plurality of line-of-sight directions on the basis of one or more evaluation items by using a plurality of images obtained by imaging the imaging target region with a plurality of imaging devices having different viewpoints; and deciding a line-of-sight direction of a virtual viewpoint, which is used to generate a virtual viewpoint video, on the basis of an evaluation result.

BRIEF DESCRIPTION OF THE DRAWINGS

Exemplary embodiments according to the technique of the present disclosure will be described in detail based on the following figures, wherein:

FIG. 8 is a conceptual diagram used to illustrate an example of a score table, FIG. 13 is a conceptual diagram used to illustrate an example of a processing content of the position and angle-of-view decision processing.

DETAILED DESCRIPTION

An example of embodiments according to the technique of the present disclosure will be described with reference to the accompanying drawings.

First, the wording used in the following description will be described.

CPU is an abbreviation of "central processing unit". RAM is an abbreviation of "random access memory". DRAM is an abbreviation of "dynamic random access memory". SRAM is an abbreviation of "static random access memory". ROM is an abbreviation of "read only memory". SSD is an abbreviation of "solid state drive". HDD is an abbreviation of "hard disk drive". EEPROM is an abbreviation of "electrically erasable and programmable read only memory". I/F is an abbreviation of "interface". IC is an abbreviation of "integrated circuit". ASIC is an abbreviation of "application specific integrated circuit". PLD is an abbreviation of "programmable logic device". FPGA is an abbreviation of "field-programmable gate array". SoC is an abbreviation of "system-on-a-chip". CMOS is an abbreviation of "complementary metal oxide semiconductor". CCD is an abbreviation of "charge coupled device". EL is an abbreviation of "electro-luminescence". GPU is an abbreviation of "graphics processing unit". LAN is an abbreviation of "local area network". 3D is an abbreviation of "3 dimension". USB is an abbreviation of "Universal Serial Bus". "HMD" is an abbreviation of "head mounted display". GUI is an abbreviation of "graphical user interface". LTE is an abbreviation of "Long Term Evolution". 5G is an abbreviation of "5th generation (wireless technology for digital cellular networks)". TDM is an abbreviation of "time-division multiplexing". In addition, in the description of the present specification, the meaning of "match" includes not only the meaning of complete match but also the meaning of substantial match including errors allowed in design and manufacturing.

Figure 1:
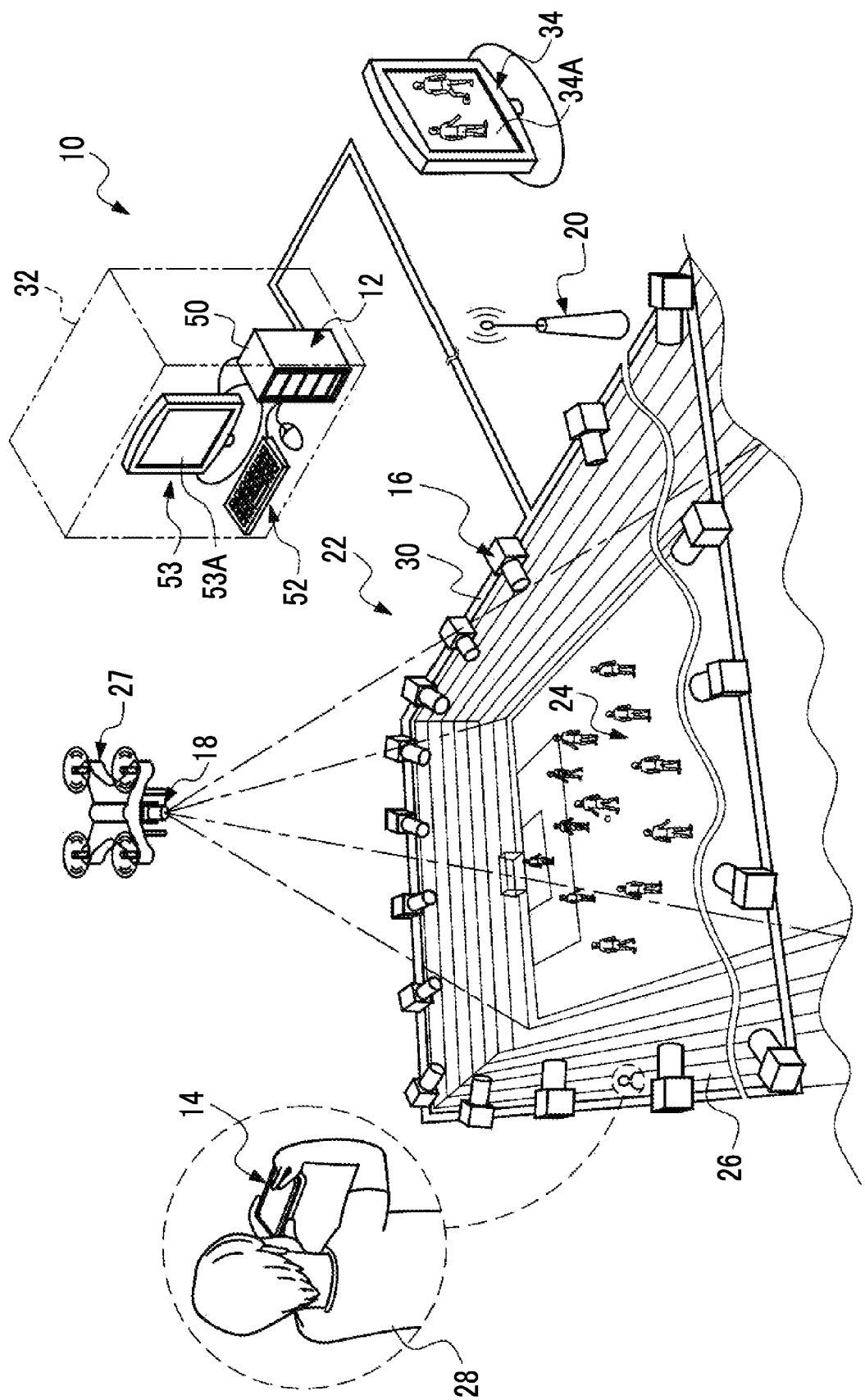
FIG. 1 is a schematic perspective view showing an example of an external configuration of an information processing system.

As shown in FIG. 1 as an example, an information processing system 10 comprises an information processing apparatus 12, a smart device 14, a plurality of imaging devices 16, an imaging device 18, a wireless communication base station (hereinafter, simply referred to as a "base station") 20, and a receiver 34. Here, the "smart device 14" refers to, for example, a portable multifunctional terminal, such as a smartphone, a tablet terminal, a smart watch (watch-type multifunctional terminal), and an HMD-type multifunctional terminal. Here, the receiver 34 is described as an example, but the technique of the present disclosure is not limited thereto, and the receiver 34 may be an electronic device with a display (for example, a smart device). In addition, the number of the base stations 20 is not limited to one, and a plurality of base stations 20 may exist. Further, the communication standards used in the base station include a wireless communication standard including a 5G standard, an LTE standard, and the like, a wireless communication standard including a WiFi (802.11) standard and/or a Bluetooth (registered trademark) standard, and a wired communication standard including a TDM standard and/or an Ethernet (registered trademark) standard.

The imaging devices 16 and 18 each are a device for imaging having a CMOS image sensor, and are equipped with an optical zoom function and/or a digital zoom function. Another type of image sensor, such as a CCD image sensor, may be adopted instead of the CMOS image sensor.

The plurality of imaging devices 16 are installed in a soccer stadium 22. Each of the plurality of imaging devices 16 is disposed so as to surround a soccer field 24, and images a region including the soccer field 24 as an imaging target region. Here, a description is given using, as an example, an aspect in which each of the plurality of imaging devices 16 is disposed so as to surround the soccer field 24, but the technique of the present disclosure is not limited thereto, and the disposition of the plurality of imaging devices 16 is decided according to a virtual viewpoint video requested to be generated by the viewer 28 or the like. The plurality of imaging devices 16 may be disposed so as to surround the entire soccer field 24, or the plurality of imaging devices 16 may be disposed so as to surround a specific part thereof. The imaging device 18 is installed in an unmanned aerial vehicle (for example, a multi-rotorcraft unmanned aerial vehicle), and images a bird's-eye view of the region including the soccer field 24 from the sky, as the imaging target region. The imaging target region as the bird's-eye view of the region including the soccer field 24 from the sky refers to a surface imaged by the imaging device 18 with respect to the soccer field 24.

The information processing apparatus 12 is installed in a control room 32. Although details will be described later, the information processing apparatus 12 includes a computer 50, a display 53, and a reception device 52, and a motion picture editing screen 53A is displayed on the display 53. The plurality of imaging devices 16 and the information processing apparatus 12 are connected through a LAN cable 30, and the information processing apparatus 12 controls the plurality of imaging devices 16 and acquires images obtained by being captured by each of the plurality of imaging devices 16. Here, the connection using the wired communication method through the LAN cable 30 is described as an example, but the technique of the present disclosure is not limited thereto, and the connection using the wireless communication method may be applied.

A spectator stand 26 is provided in the soccer stadium 22 so as to surround the soccer field 24, and a viewer 28 is seated in the spectator stand 26. The viewer 28 possesses the smart device 14, and the smart device 14 is used by the viewer 28. Here, a description is given using, as an example, an aspect in which the viewer 28 exists in the soccer stadium 22, but the technique of the present disclosure is not limited thereto, and the viewer 28 may exist outside the soccer stadium 22.

The base station 20 transmits and receives various kinds of information to and from the information processing apparatus 12 and the unmanned aerial vehicle 27 through radio waves. That is, the information processing apparatus 12 is connected to the unmanned aerial vehicle 27 through the base station 20 so as to be capable of wireless communication. The information processing apparatus 12 performs wireless communication with the unmanned aerial vehicle 27 through the base station 20 to control the unmanned aerial vehicle 27 and to acquire images obtained by being captured by the imaging device 18, from the unmanned aerial vehicle 27.

The base station 20 transmits various kinds of information to the receiver 34 through wireless communication. The information processing apparatus 12 transmits various videos to the receiver 34 through the base station 20, and the receiver 34 receives various videos transmitted from the information processing apparatus 12 and displays the received various videos on a screen 34A. The receiver 34 is used, for example, for viewing by an unspecified number of spectators and the like. The location where the receiver 34 is installed may be inside the soccer stadium 22, outside the soccer stadium 22 (for example, a public viewing venue), or the like. Here, a description is given using, as an example, an aspect in which the information processing apparatus 12 transmits various kinds of information to the receiver 34 through wireless communication, but the technique of the present disclosure is not limited thereto, and for example, an aspect in which the information processing apparatus 12 transmits various kinds of information to the receiver 34 through wired communication may be adopted.

The information processing apparatus 12 is a device corresponding to a server, and the smart device 14 is a device corresponding to a client terminal with respect to the information processing apparatus 12. The information processing apparatus 12 and the smart device 14 perform wireless communication with each other through the base station 20, whereby the smart device 14 requests the provision of various services of the information processing apparatus 12 and the information processing apparatus 12 provides the smart device 14 with a service corresponding to the request from the smart device 14.

Figure 2:
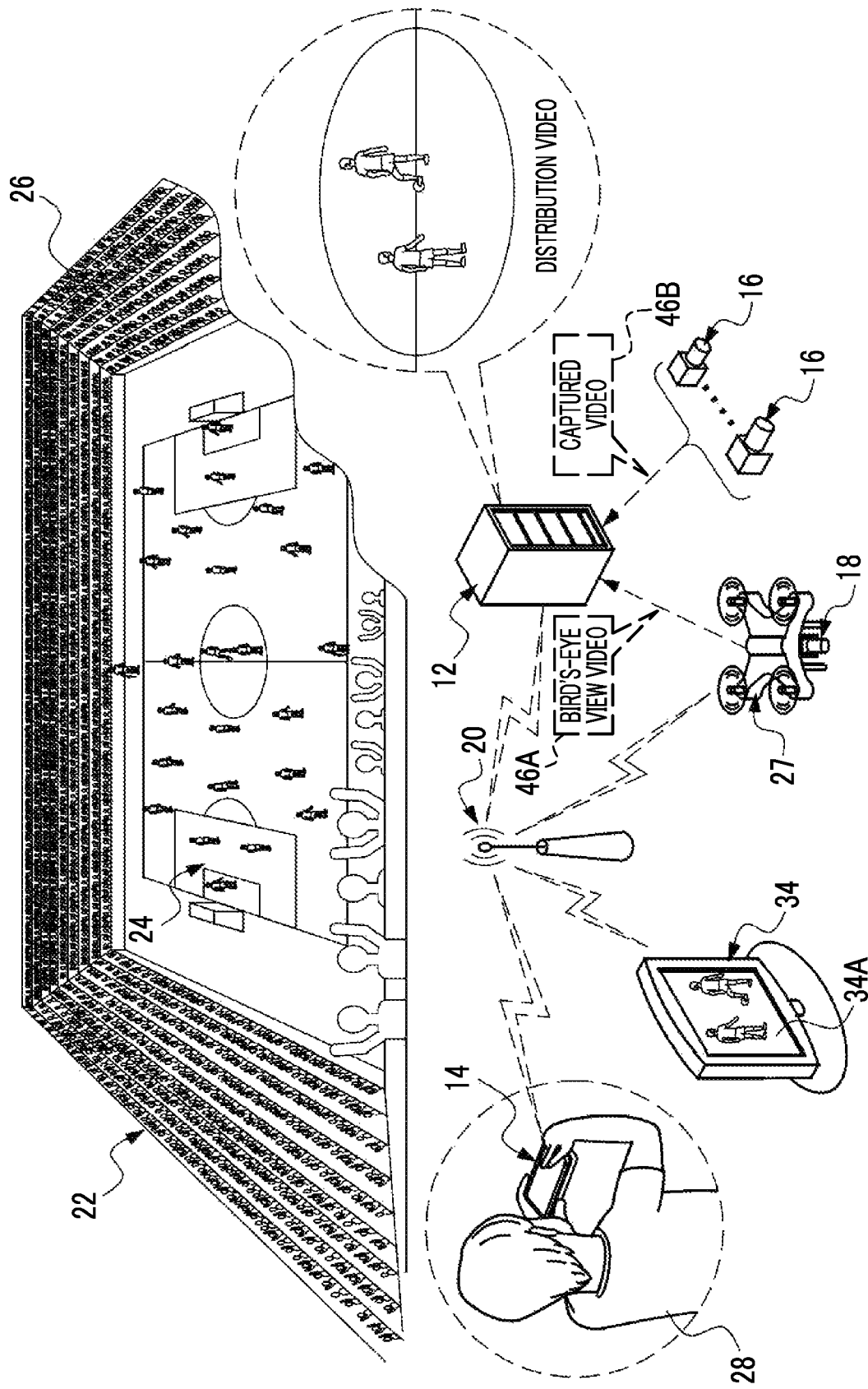
FIG. 2 is a conceptual diagram showing an example of a relationship between an information processing apparatus, a smart device, a receiver, an unmanned aerial vehicle, and an imaging device that are included in the information processing system.

As shown in FIG. 2 as an example, the information processing apparatus 12 acquires, from the unmanned aerial vehicle 27, a bird's-eye view video 46A showing the region including the soccer field 24 as observed from the sky. The bird's-eye view video 46A is a moving image obtained by imaging the bird's-eye view of the region including the soccer field 24 from the sky as the imaging target region with the imaging device 18 of the unmanned aerial vehicle 27.

The information processing apparatus 12 acquires, from each of the plurality of imaging devices 16, a captured video 46B showing the imaging target region as observed from a position of each of the plurality of imaging devices 16. The captured video 46B is a moving image obtained by imaging the imaging target region with each of the plurality of imaging devices 16. The captured video 46B obtained by imaging the target region with the imaging device 16 is an example of the "image" according to the technique of the present disclosure.

A user can generate a distribution video by operating the reception device 52 on the basis of GUIs of the motion picture editing screen 53A displayed on the display 53.

Figure 3:
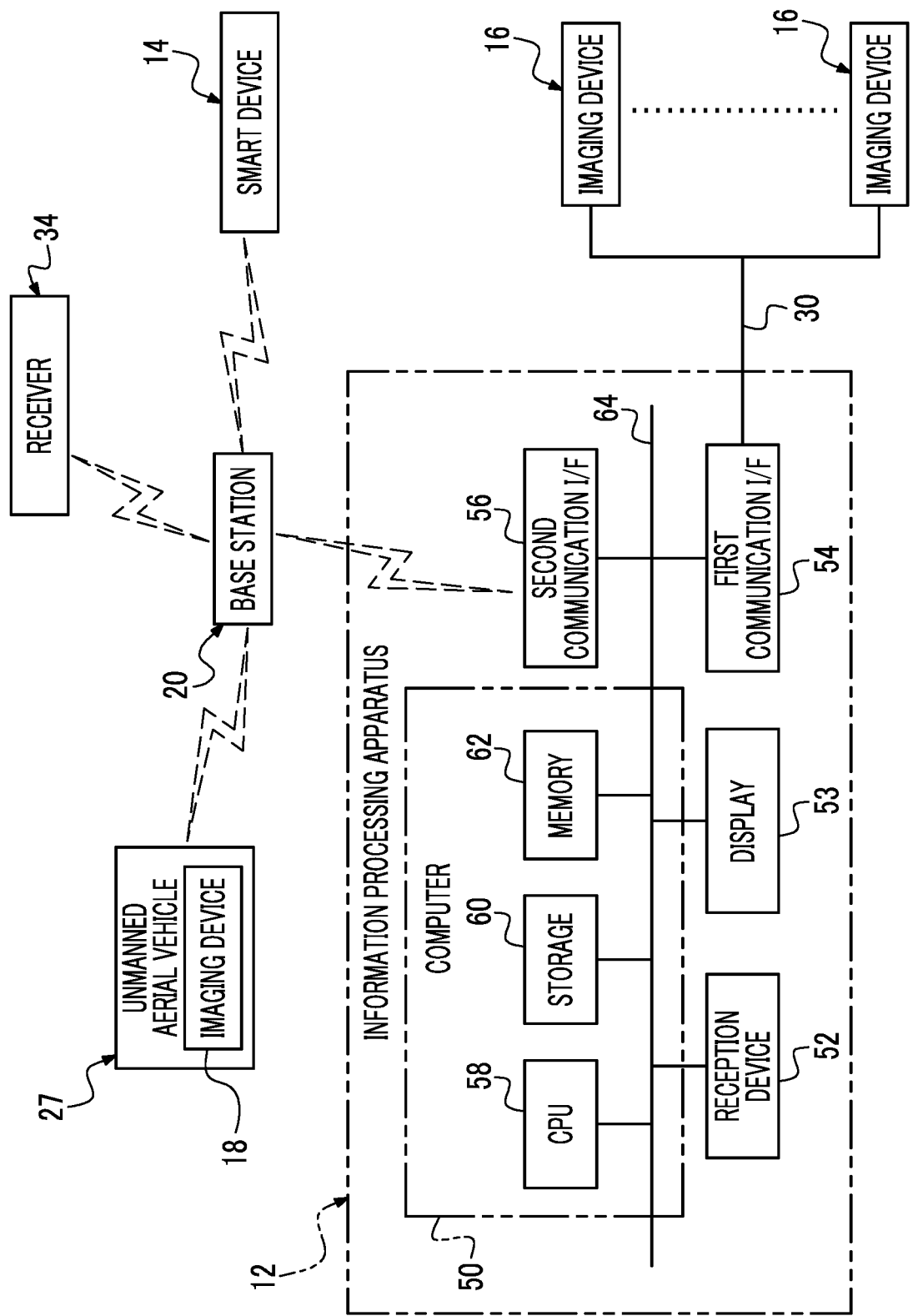
FIG. 3 is a block diagram showing an example of a hardware configuration of an electrical system of the information processing apparatus and an example of a relation between the information processing apparatus and peripheral devices.

As shown in FIG. 3 as an example, the information processing apparatus 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other through a bus 64. In the example shown in FIG. 3, one bus is shown as the bus 64 for convenience of illustration, but a plurality of buses may be used. In addition, the bus 64 may include a serial bus or a parallel bus constituted of a data bus, an address bus, a control bus, and the like.

The CPU 58 controls the entire information processing apparatus 12. The storage 60 stores various parameters and various programs. The storage 60 is a non-volatile storage device. Here, a flash memory is adopted as an example of the storage 60, but the technique of the present disclosure is not limited thereto, and an EEPROM, an HDD, an SSD, or the like may be adopted. The memory 62 is a storage device. The memory 62 temporarily stores various kinds of information. The memory 62 is used as a work memory by the CPU 58. Here, a DRAM is adopted as an example of the memory 62, but the technique of the present disclosure is not limited thereto, and another type of storage device may be adopted. The CPU 58 is an example of the "processor" according to the technique of the present disclosure. Further, the storage 60 and the memory 62 are an example of the "memory" according to the technique of the present disclosure.

The reception device 52 receives an instruction from a user or the like of the information processing apparatus 12. An example of the reception device 52 includes a keyboard, a touch panel, and a mouse. The reception device 52 is connected to the bus 64 or the like, and the instruction received by the reception device 52 is acquired by the CPU 58.

The display 53 is connected to the bus 64 and displays various kinds of information under the control of the CPU 58. An example of the display 53 includes a liquid crystal display. The technique of the present disclosure is not limited to the liquid crystal display, another type of display, such as an organic EL display, may be adopted as the display 53.

The first communication I/F 54 is connected to the LAN cable 30. The first communication I/F 54 is realized by, for example, a device having an FPGA. The first communication I/F 54 is connected to the bus 64 and takes charge of the exchange of various kinds of information between the CPU 58 and the plurality of imaging devices 16. For example, the first communication I/F 54 controls the plurality of imaging devices 16 in accordance with the request of the CPU 58. Further, the first communication I/F 54 outputs the captured video 46B (see FIG. 2) obtained by being captured by each of the plurality of imaging devices 16 to the CPU 58. Here, the first communication I/F 54 is described as an example of a wired communication I/F, but a wireless communication I/F, such as a high-speed wireless LAN, may be used.

The second communication I/F 56 is connected to the base station 20 so as to be capable of wireless communication. The second communication I/F 56 is realized, for example, by a device having an FPGA. The second communication I/F 56 is connected to the bus 64. The second communication I/F 56 takes charge of the exchange of various kinds of information between the CPU 58 and the unmanned aerial vehicle 27 in a wireless communication method, through the base station 20. In addition, the second communication I/F 56 takes charge of the exchange of various kinds of information between the CPU 58 and the smart device 14 in a wireless communication method, through the base station 20. Further, the second communication I/F 56 takes charge of the transmission of various videos to the receiver 34, which is performed by the CPU 58, in a wireless communication method, through the base station 20. At least one of the first communication I/F 54 or the second communication I/F 56 can be constituted of a fixing circuit instead of an FPGA. Alternatively, at least one of the first communication I/F 54 or the second communication I/F 56 may be a circuit constituted of, for example, an ASIC, an FPGA, and/or a PLD.

Figure 4:
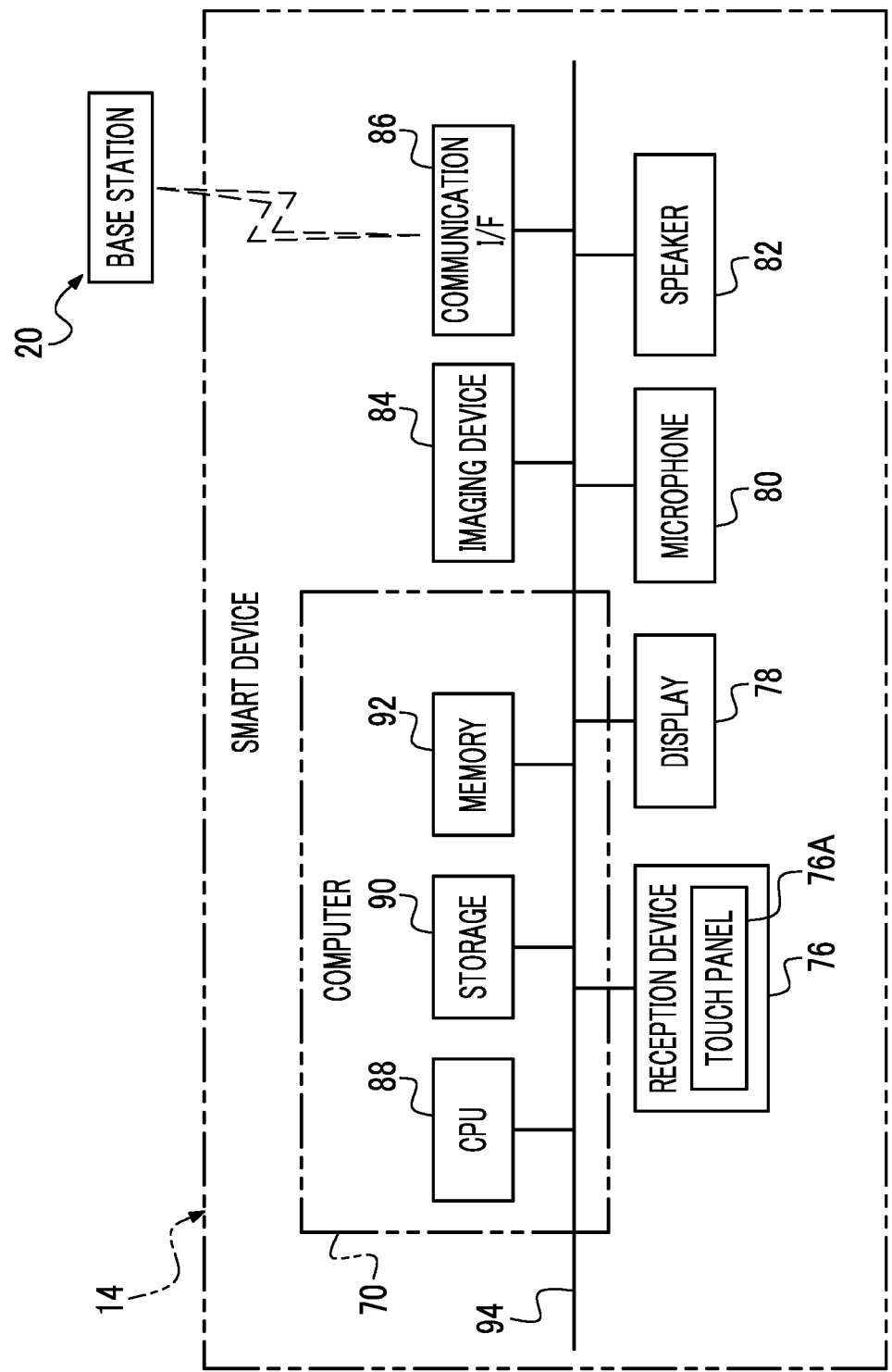
FIG. 4 is a block diagram showing an example of a hardware configuration of an electrical system of the smart device.

As shown in FIG. 4 as an example, the smart device 14 comprises a computer 70, a reception device 76, a display 78, a microphone 80, a speaker 82, an imaging device 84, and a communication I/F 86. The computer 70 comprises a CPU 88, a storage 90, and a memory 92, and the CPU 88, the storage 90, and the memory 92 are connected to each other through a bus 94. In the example shown in FIG. 4, one bus is shown as the bus 94 for convenience of illustration, but the bus 94 may be a plurality of buses. The bus 94 may be a serial bus or a parallel bus including a data bus, an address bus, a control bus, and the like.

The CPU 88 controls the entire smart device 14. The storage 90 stores various parameters and various programs. The storage 90 is a non-volatile storage device. Here, a flash memory is adopted as an example of the storage 90. The flash memory is merely an example, and examples of the storage 90 include various non-volatile memories, such as a magnetoresistive memory and/or a ferroelectric memory, instead of the flash memory or in combination with the flash memory. Further, the non-volatile storage device may be, for example, an EEPROM, an HDD, and/or an SSD. The memory 92 temporarily stores various kinds of information and is used as a work memory by the CPU 88. An example of the memory 92 includes a RAM, but the technique of the present disclosure is not limited thereto, and another type of storage device may be used.

The reception device 76 receives an instruction from a user or the like (here, as an example, the viewer 28) of the smart device 14. An example of the reception device 76 includes a touch panel 76A and a hard key. The reception device 76 is connected to the bus 94, and the instruction received by the reception device 76 is acquired by the CPU 88.

The display 78 is connected to the bus 94 and displays various kinds of information under the control of the CPU 88. An example of the display 78 includes a liquid crystal display. The technique of the present disclosure is not limited to the liquid crystal display, another type of display, such as an organic EL display, may be adopted as the display 78.

The smart device 14 comprises a touch panel/display, and the touch panel/display is realized by the touch panel 76A and the display 78. That is, the touch panel/display is formed by overlapping the touch panel 76A with the display region of the display 78 or by incorporating the touch panel function inside the display 78 ("in-cell" type).

The microphone 80 converts collected sound into an electrical signal. The microphone 80 is connected to the bus 94. The electrical signal obtained by converting the collected sound with the microphone 80 is acquired by the CPU 88 through the bus 94.

The speaker 82 converts the electrical signal into sound. The speaker 82 is connected to the bus 94. The speaker 82 receives the electrical signal output from the CPU 88 through the bus 94, converts the received electrical signal into sound, and outputs the sound obtained by converting the electrical signal, to the outside of the smart device 14.

The imaging device 84 images the subject to acquire an image showing the subject. The imaging device 84 is connected to the bus 94. The image obtained by imaging the subject with the imaging device 84 is acquired by the CPU 88 through the bus 94.

The communication I/F 86 is connected to the base station 20 so as to be capable of wireless communication. The communication I/F 86 is realized, for example, by a device constituted of a circuit (for example, an ASIC, an FPGA, and/or PLD). The communication I/F 86 is connected to the bus 94. The communication I/F 86 takes charge of the exchange of various kinds of information between the CPU 88 and the external device in a wireless communication method, through the base station 20. Here, examples of the "external device" include the information processing apparatus 12.

Figure 5:
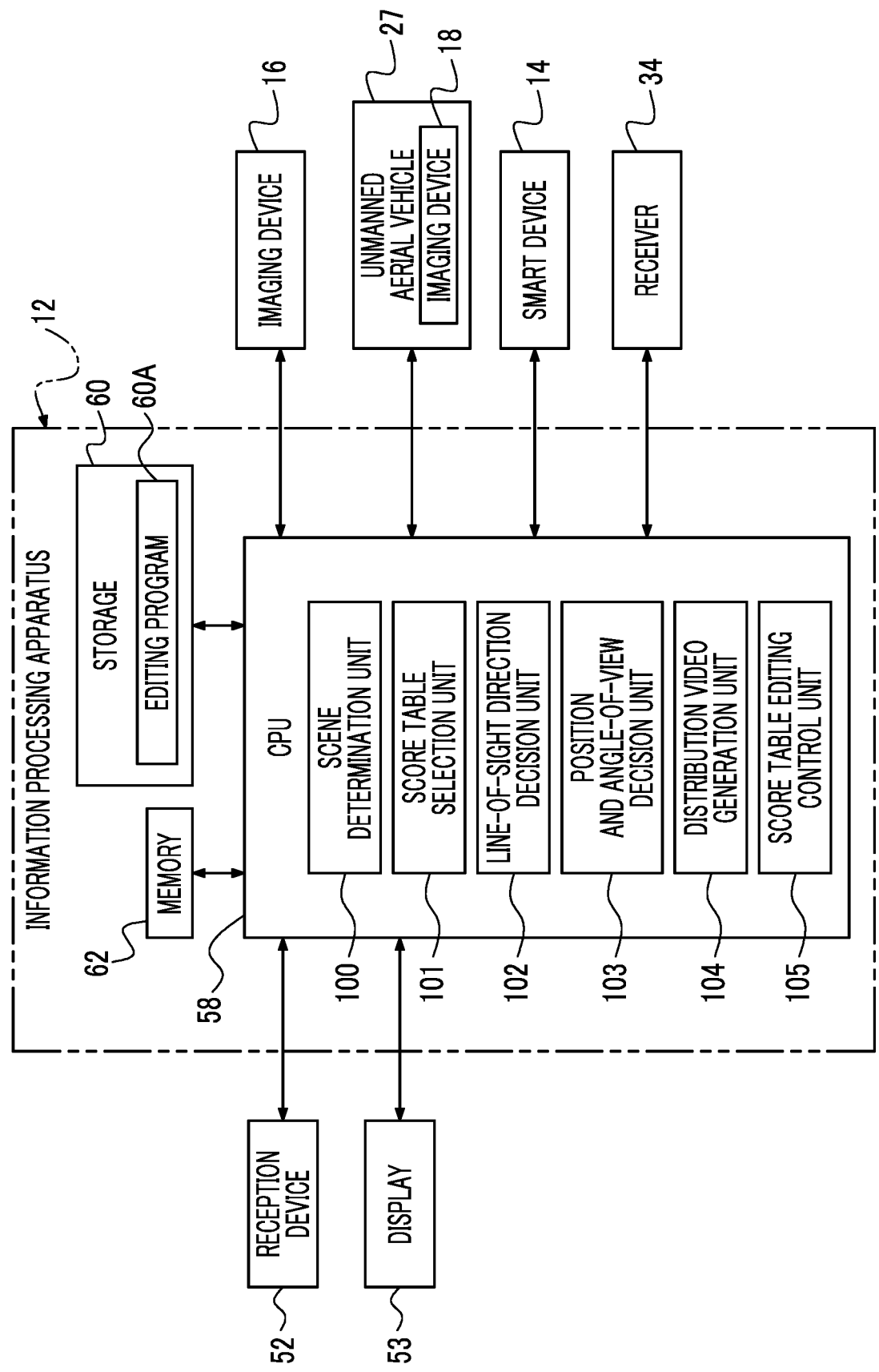
FIG. 5 is a block diagram showing an example of functions of main units of the information processing apparatus.

As shown in FIG. 5 as an example, in the information processing apparatus 12, the storage 60 stores an editing program 60A. The CPU 58 reads out the editing program 60A from the storage 60, and executes the read-out editing program 60A on the memory 62. The CPU 58 exchanges various kinds of information between the smart device 14, the imaging device 16, and the unmanned aerial vehicle 27 in accordance with the editing program 60A executed on the memory 62, and transmits various videos to the receiver 34. The editing program 60A is a program for causing the computer 50 to execute processing, and is an example of the "program" according to the technique of the present disclosure.

The CPU 58 reads out the editing program 60A from the storage 60, and executes the read-out editing program 60A on the memory 62. The CPU 58 operates as a scene determination unit 100, a score table selection unit 101, a line-of-sight direction decision unit 102, a position and angle-of-view decision unit 103, a distribution video generation unit 104, and a score table editing control unit 105 in accordance with the editing program 60A executed on the memory 62, to execute various kinds of information processing, which will be described later.

Figure 6:
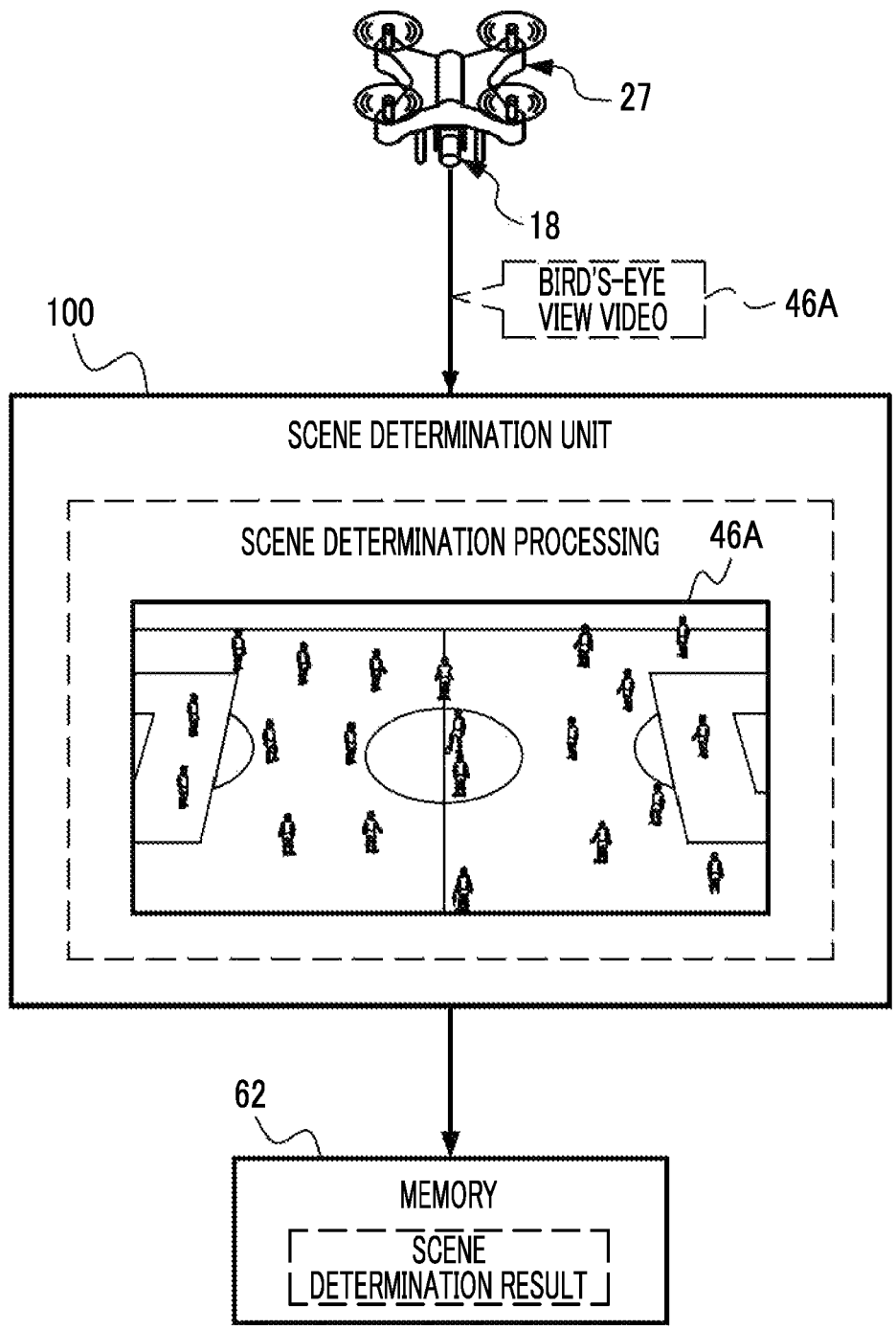
FIG. 6 is a conceptual diagram used to illustrate an example of a processing content of scene determination processing.

As shown in FIG. 6 as an example, in the information processing apparatus 12, scene determination processing is performed by the scene determination unit 100. The scene determination unit 100 acquires the bird's-eye view video 46A from the imaging device 18. Then, the scene determination unit 100 determines a scene shown by the bird's-eye view video 46A by analyzing the acquired bird's-eye view video 46A. For example, in a case where the soccer field 24 is the imaging target region, the scene includes "during the match", "half time", "entrance", and the like. The scene "during the match" is a scene corresponding to a case where the players of both teams continue the match. The scene "half time" is a scene corresponding to a case where the players of both teams stop the match. The scene "entrance" is a scene in which the players enter the soccer field 24.

The scene determination unit 100 periodically performs the scene determination processing, for example, at a constant time interval to determine which scene the bird's-eye view video 46A shows, and causes the memory 62 to store the determination result (hereinafter, referred to as a "scene determination result"). The scene is not limited to the scenes "during the match", "half time", and "entrance", and the type and number of scenes can be appropriately changed according to an imaging target.

Figure 7:
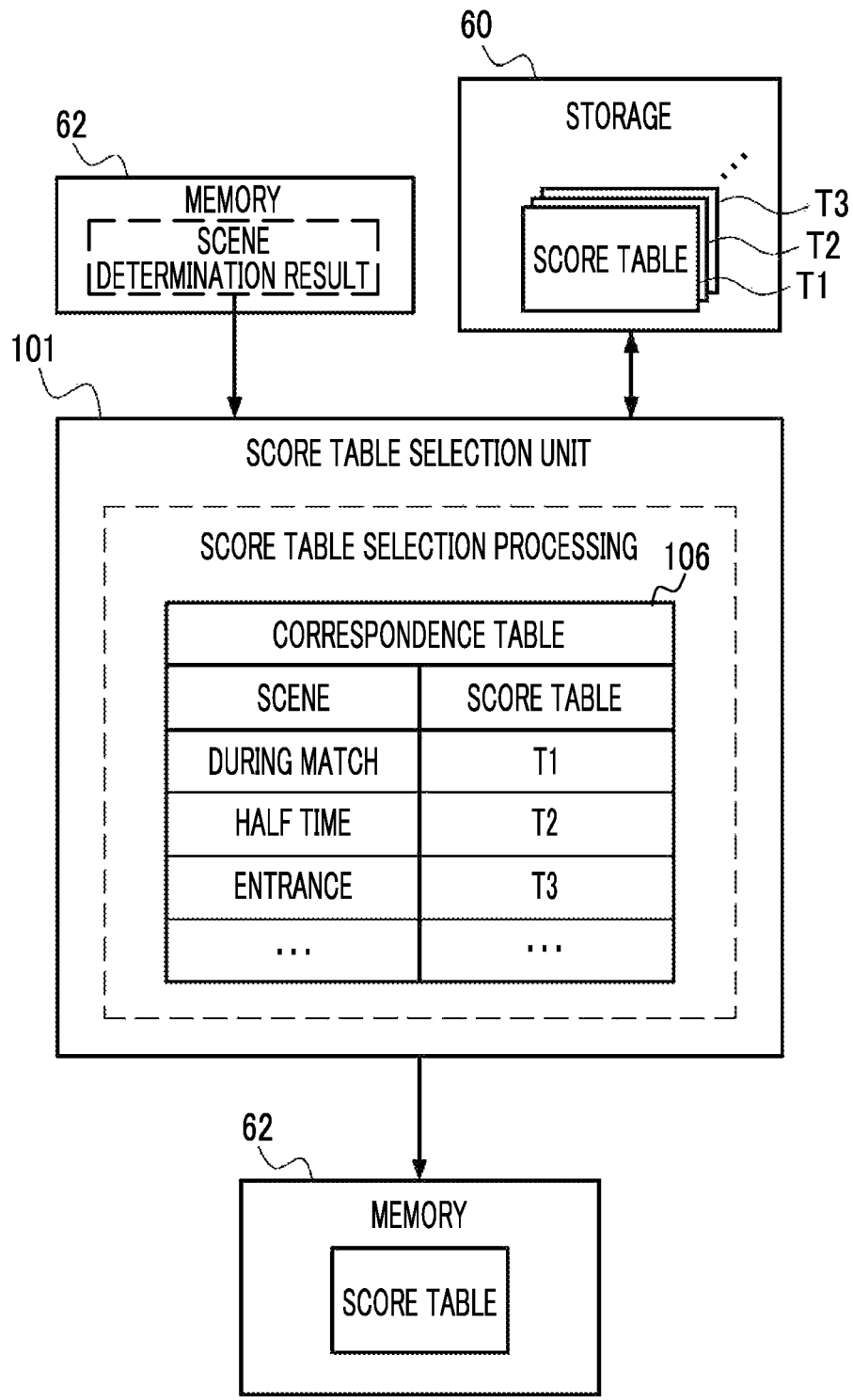
FIG. 7 is a conceptual diagram used to illustrate an example of a processing content of score table selection processing.

As shown in FIG. 7 as an example, in the information processing apparatus 12, score table selection processing is performed by the score table selection unit 101. A score table is used to evaluate the imaging target region from a plurality of line-of-sight directions by using the plurality of captured videos 46B obtained by the imaging performed by the plurality of imaging devices 16.

The score table selection unit 101 reads out the scene determination result determined by the scene determination unit 100 from the memory 62, and selects a score table corresponding to the scene indicated by the read-out scene determination result by using a correspondence table 106. In the correspondence table 106, a score table is associated with the corresponding scene. For example, a score table T1 is associated with the scene "during the match". A score table T2 is associated with the scene "half time". A score table T3 is associated with the scene "entrance".

A plurality of score tables are stored in the storage 60. The score table selection unit 101 selects a score table corresponding to the scene determination result from the plurality of score tables stored in the storage 60 on the basis of the correspondence table 106, and causes the memory 62 to store the score table. The contents of the correspondence table 106 are appropriately changed according to the type and number of scenes.

FIG. 8 shows an example of the plurality of score tables stored in the storage 60. The score table includes one or more evaluation items, and a score is set for each evaluation item. The score is a numerical value given in a case where a factor corresponding to the evaluation item exists, and includes a positive value and/or a negative value. For example, five evaluation items A to E are set in the score table T1 corresponding to the scene "during the match". Further, as an example, a score "+10" is set for the evaluation item A, a score "+8" is set for the evaluation item B, a score "+4" is set for the evaluation item C, a score "−5" is set for the evaluation item D, and a score "−2" is set for the evaluation item E.

In the example of the score table T1 shown in FIG. 8, "ball" is set as a factor corresponding to the evaluation item A. That is, in a case where the factor "ball" is included in an image to be evaluated, determination is made that the factor corresponding to the evaluation item A exists, and the score "+10" is given. In addition, "face and limbs of the player closest to the ball" is set as a factor corresponding to the evaluation item B. That is, in a case where the factor "face and limbs of the player closest to the ball" is included in the image to be evaluated, determination is made that the factor corresponding to the evaluation item B exists, and the score "+8" is given. In addition, "faces and limbs of other players" is set as a factor corresponding to the evaluation item C. That is, in a case where the factor "faces and limbs of other players" is included in the image to be evaluated, determination is made that the factor corresponding to the evaluation item C exists, and the score "+4" is given.

In addition, "referee" is set as a factor corresponding to the evaluation item D. That is, in a case where the factor "referee" is included in the image to be evaluated, determination is made that the factor corresponding to the evaluation item D exists, and the score "−5" is given. That is, 5 points are deducted. Further, "face of the spectator" is set as a factor corresponding to the evaluation item E. That is, in a case where the factor "face of the spectator" is included in the image to be evaluated, determination is made that the factor corresponding to the evaluation item E exists, and the score "−2" is given. That is, 2 points are deducted.

Figure 9:
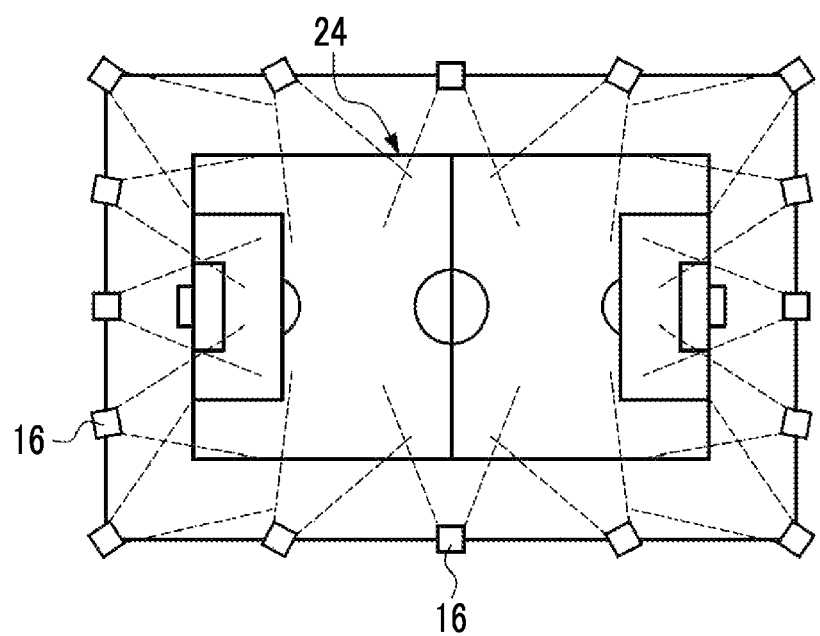
FIG. 9 is a conceptual diagram used to illustrate an example of disposition of the imaging device.

As shown in FIG. 9 as an example, the plurality of imaging devices 16 are disposed in a two-dimensional plane so as to surround the soccer field 24 as the imaging target region. For example, the plurality of imaging devices 16 are disposed along each side of a rectangular shape, which surrounds the soccer field 24, and have different imaging directions, that is, different line-of-sight directions from each other.

Figure 10:
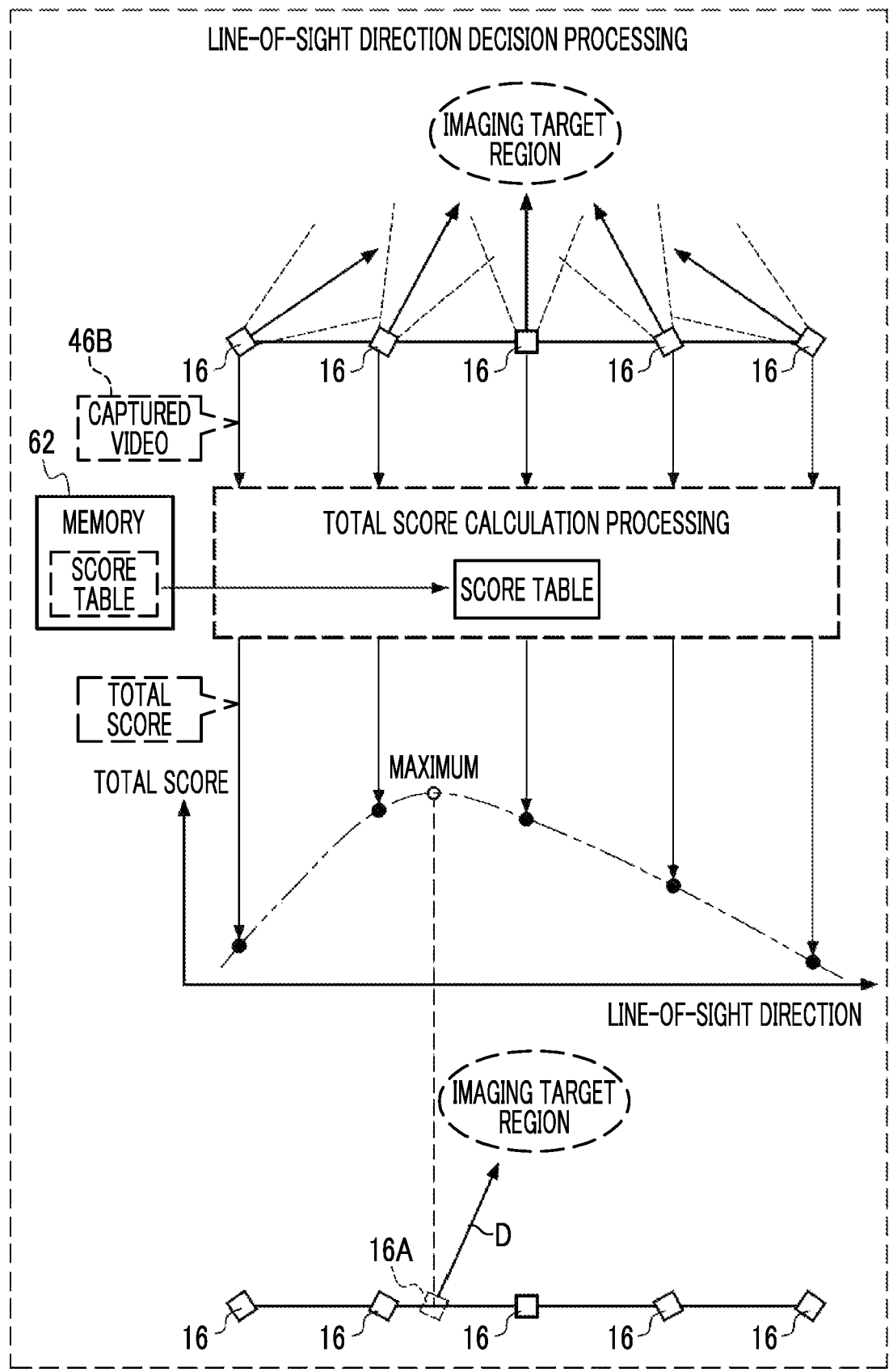
FIG. 10 is a conceptual diagram used to illustrate an example of a processing content of line-of-sight direction decision processing.

As shown in FIG. 10 as an example, in the information processing apparatus 12, line-of-sight direction decision processing is performed by the line-of-sight direction decision unit 102. The line-of-sight direction decision unit 102 acquires the captured video 46B from each of the plurality of imaging devices 16. The line-of-sight direction decision unit 102 reads out the score table selected by the score table selection unit 101 from the memory 62, and evaluates each captured video 46B on the basis of the read-out score table. Although details will be described later, the line-of-sight direction decision unit 102 performs total score calculation processing for calculating the total score for each of the captured videos 46B, on the basis of the score table.

The line-of-sight direction decision unit 102 estimates a line-of-sight direction in which the total score is the maximum on the basis of the relationship between the plurality of calculated total scores and the imaging directions (that is, the line-of-sight directions) of the imaging devices 16. For example, the line-of-sight direction decision unit 102 generates a interpolation curve indicating the relationship between the plurality of calculated total scores and the line-of-sight directions, and estimates the line-of-sight direction in which the total score is the maximum in the generated interpolation curve. The line-of-sight direction decision unit 102 decides the line-of-sight direction obtained by the estimation, as a line-of-sight direction D of the virtual viewpoint. The line-of-sight direction D of the virtual viewpoint decided by the line-of-sight direction decision unit 102 is, for example, the line-of-sight direction of a virtual camera 16A virtually disposed on one side of the rectangular shape in which the plurality of imaging devices 16 are disposed.

Figure 11:
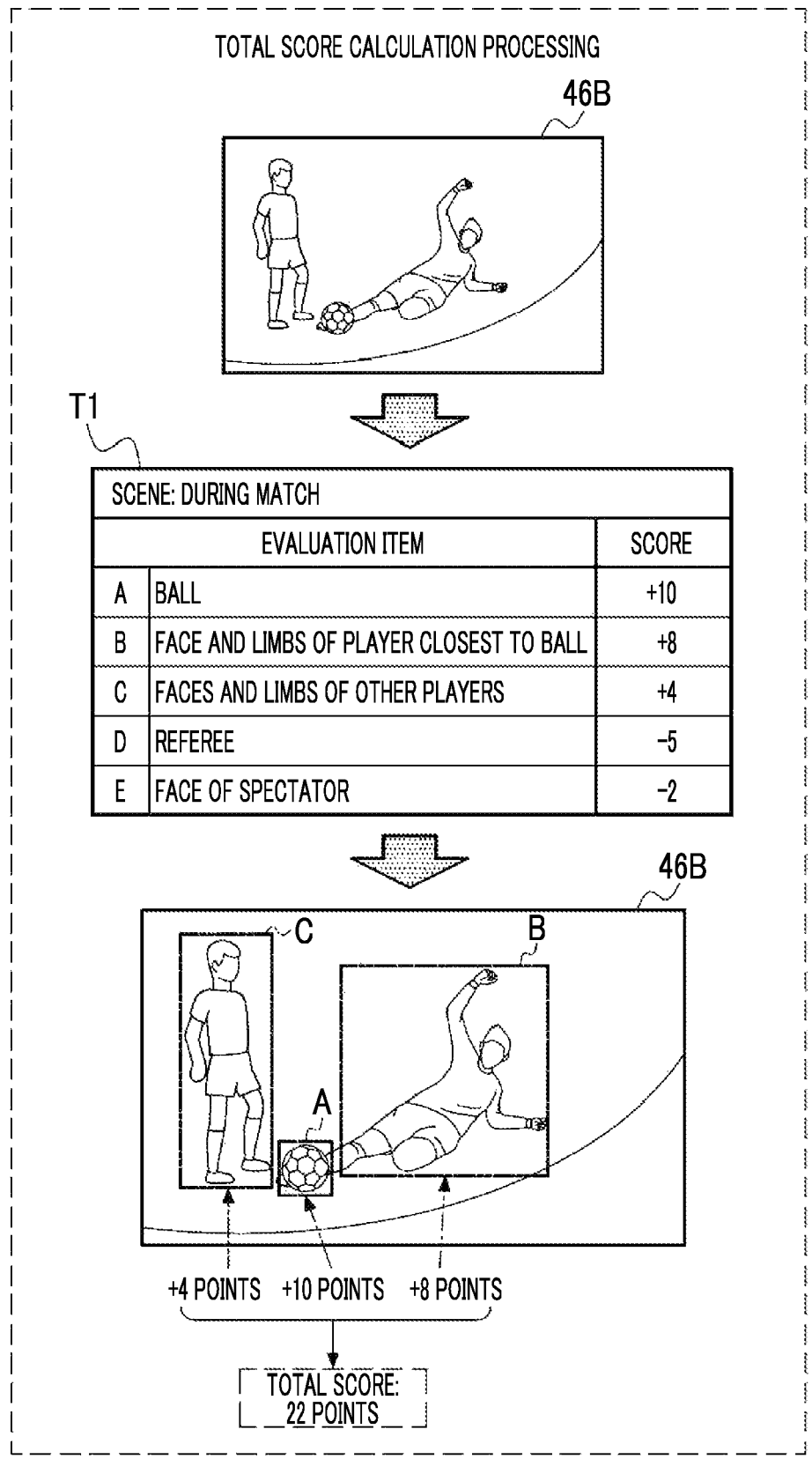
FIG. 11 is a conceptual diagram used to illustrate an example of a processing content of total score calculation processing.

As shown in FIG. 11 as an example, the line-of-sight direction decision unit 102 performs the above-mentioned total score calculation processing. The line-of-sight direction decision unit 102 refers to the score table to determine whether or not a factor corresponding to each evaluation item exists in the captured video 46B to be evaluated, and gives the score set in each evaluation item in a case where the factor exists. Then, the line-of-sight direction decision unit 102 calculates the total score by obtaining the sum of the given scores.

In the example shown in FIG. 11, the factor "ball", which is the factor corresponding to the evaluation item A, the factor "face and limbs of the player closest to the ball", which is the factor corresponding to the evaluation item B, and the factor "faces and limbs of other players", which is the factor corresponding to the evaluation item C, exist in the captured video 46B. As a result, the score "+10" is given to the evaluation item A, the score "+8" is given to the evaluation item B, and the score "+4" is given to the evaluation item C, whereby the total score calculated by the line-of-sight direction decision unit 102 is "22 points".

In the present embodiment, the evaluation items are the type of an object included in the imaging target region (for example, "ball", "face and limbs of the player closest to the ball", "referee", and "face of the spectator"). Therefore, the line-of-sight direction decision unit 102 detects the object corresponding to the evaluation item from the captured video 46B by using, for example, a method such as machine learning. The line-of-sight direction decision unit 102 may give one score to a rectangular region including the detected object, or may give a score to each pixel of the detected object.

Figure 12:
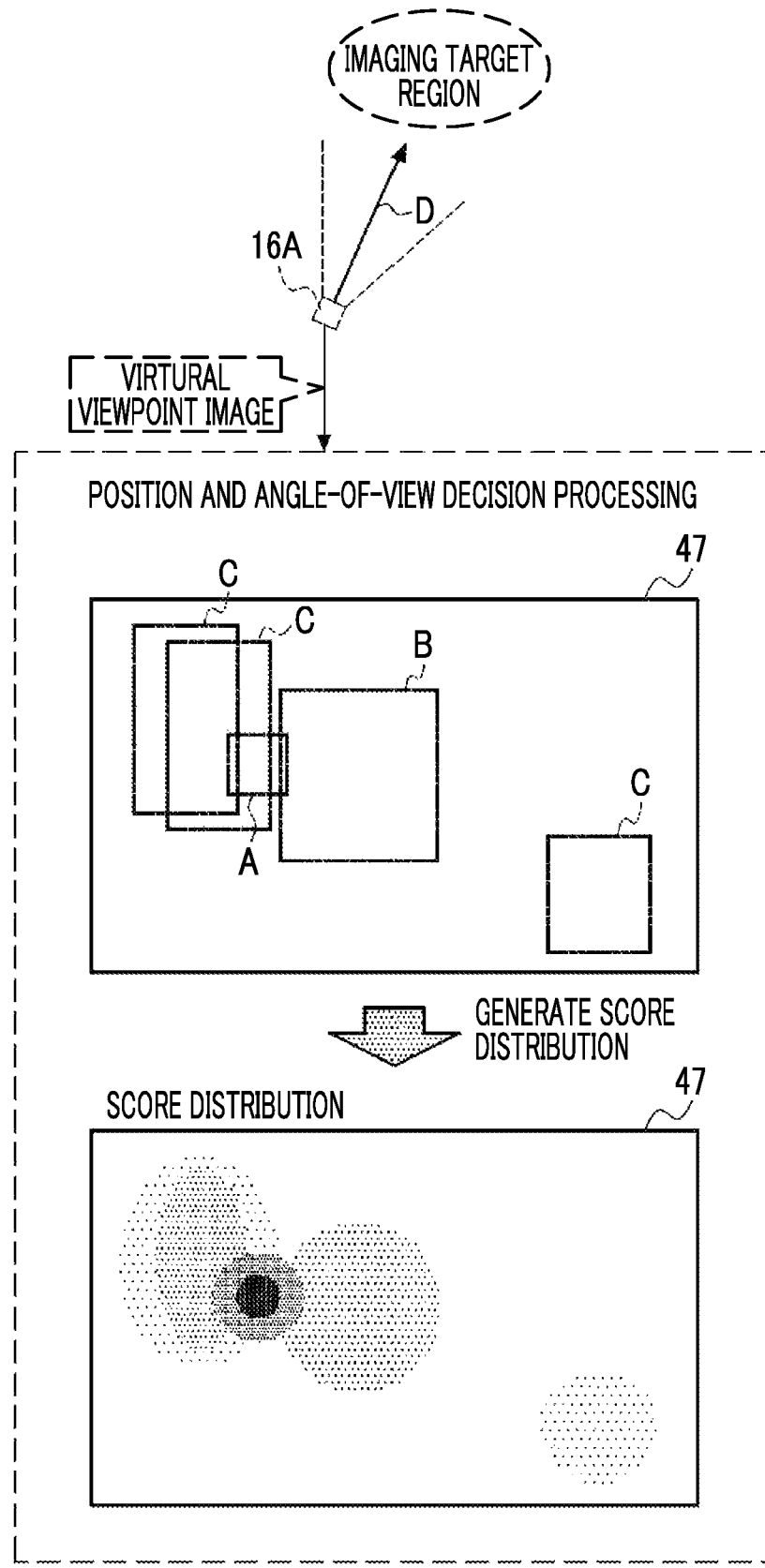
FIG. 12 is a conceptual diagram used to illustrate an example of a processing content of position and angle-of-view decision processing.

As shown in FIGS. 12 and 13 as an example, in the information processing apparatus 12, position and angle-of-view decision processing is performed by the position and angle-of-view decision unit 103. As shown in FIG. 12, the position and angle-of-view decision unit 103 acquires a virtual viewpoint video 47 captured by the virtual camera 16A having the line-of-sight direction D decided by the line-of-sight direction decision unit 102. Then, the position and angle-of-view decision unit 103 generates the distribution of the scores (hereinafter, referred to as "score distribution") based on the score table, on the basis of the virtual viewpoint video 47. This score distribution corresponds to, in a case where a virtual plane perpendicular to the line-of-sight direction D is assumed, the distribution in which the scores obtained by using the captured video 46B are transferred to the assumed virtual plane.

In the present embodiment, as an example, the position and angle-of-view decision unit 103 generates the score distribution by detecting the object corresponding to the evaluation item from the virtual viewpoint video 47 and giving a score to the detected object, in the same manner as the above-mentioned total score calculation processing. FIG. 12 shows an example in which a score is given to each pixel of the detected objects, for example. In the example shown in FIG. 12, the density of the scores is expressed by color depth, and the higher the color depth is, the higher the density of scores is.

As shown in FIG. 13, the position and angle-of-view decision unit 103 decides the position and the angle of view of the virtual viewpoint on the basis of the score distribution in the imaging target region. First, the position and angle-of-view decision unit 103 moves the line-of-sight direction D of the virtual viewpoint decided by the line-of-sight direction decision unit 102, on the basis of the score distribution. Specifically, the position and angle-of-view decision unit 103 moves the line-of-sight direction D in parallel such that the line-of-sight direction D is positioned in a region where the density of the scores is highest. Next, the position and angle-of-view decision unit 103 decides a position P and an angle of view A of the virtual viewpoint by using the line-of-sight direction D after movement as a reference. For example, the position and angle-of-view decision unit 103 decides the angle of view A such that the density of the scores in the visual field region is highest.

The position and angle-of-view decision unit 103 causes the memory 62 to store the viewpoint information including the decided line-of-sight direction D, position P, and angle of view A of the virtual viewpoint. The virtual viewpoint is periodically updated by the above-mentioned scene determination processing, score table selection processing, line-of-sight direction decision processing, and position and angle-of-view decision processing that are repeatedly performed. That is, the viewpoint information includes a temporal change of the virtual viewpoint.

Figure 14:
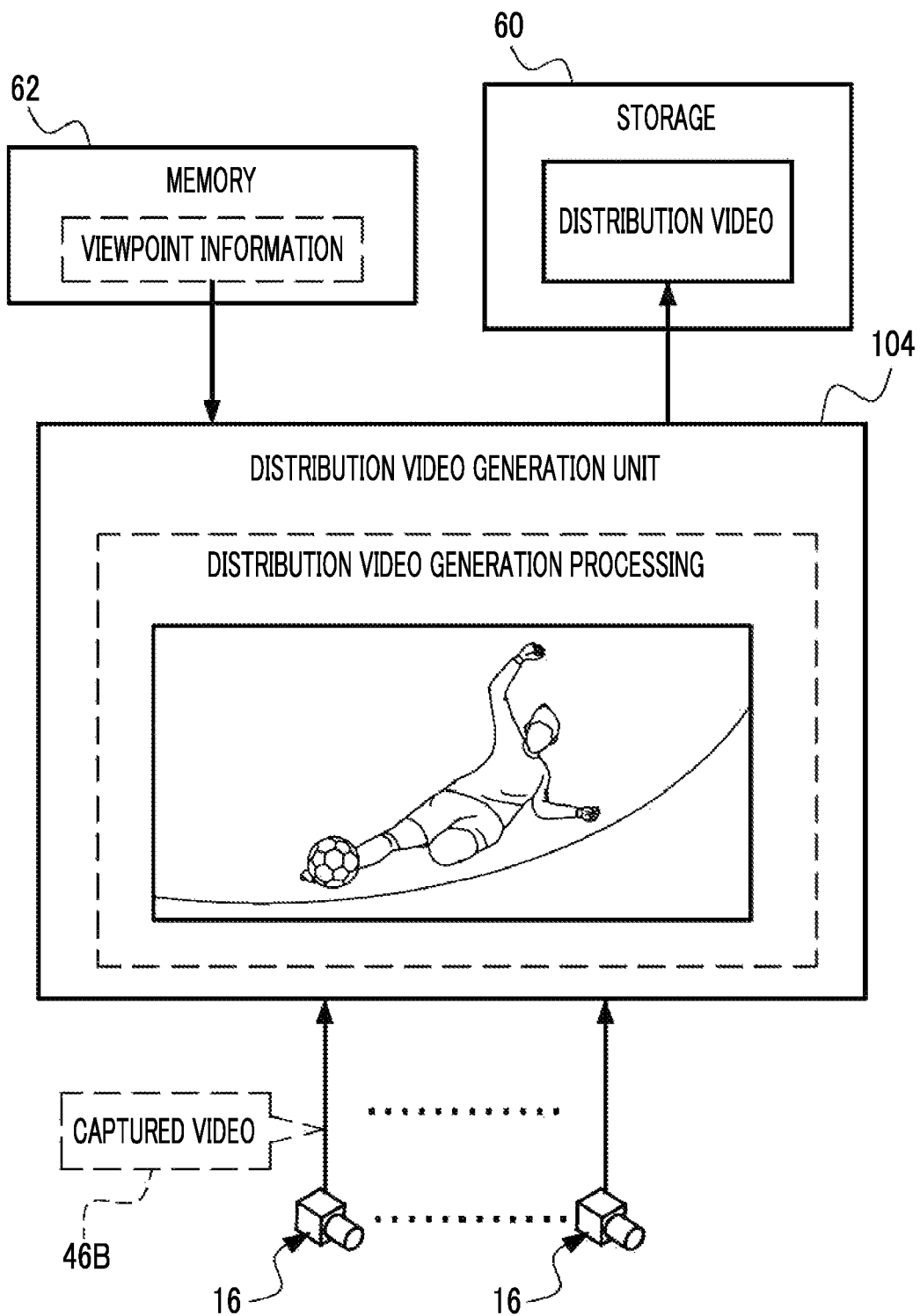
FIG. 14 is a conceptual diagram used to illustrate an example of a processing content of distribution video generation processing.

As shown in FIG. 14 as an example, in the information processing apparatus 12, distribution video generation processing is performed by the distribution video generation unit 104. The distribution video generation unit 104 reads out the viewpoint information decided by the position and angle-of-view decision unit 103, from the memory 62. Further, the distribution video generation unit 104 acquires the captured video 46B from each of the plurality of imaging devices 16. The distribution video generation unit 104 generates 3D polygons on the basis of the plurality of captured videos 46B to generate a virtual viewpoint video using the viewpoint information as a reference. This virtual viewpoint video is a virtual video obtained in a case where the imaging target region is observed at the angle of view A from the position P of the virtual viewpoint toward the line-of-sight direction D. The distribution video generation unit 104 generates the virtual viewpoint video by using a virtual viewpoint that temporally changes as a reference, thereby generating a distribution video as motion picture data. The distribution video generation unit 104 causes the storage 60 to store the generated distribution video.

Figure 15:
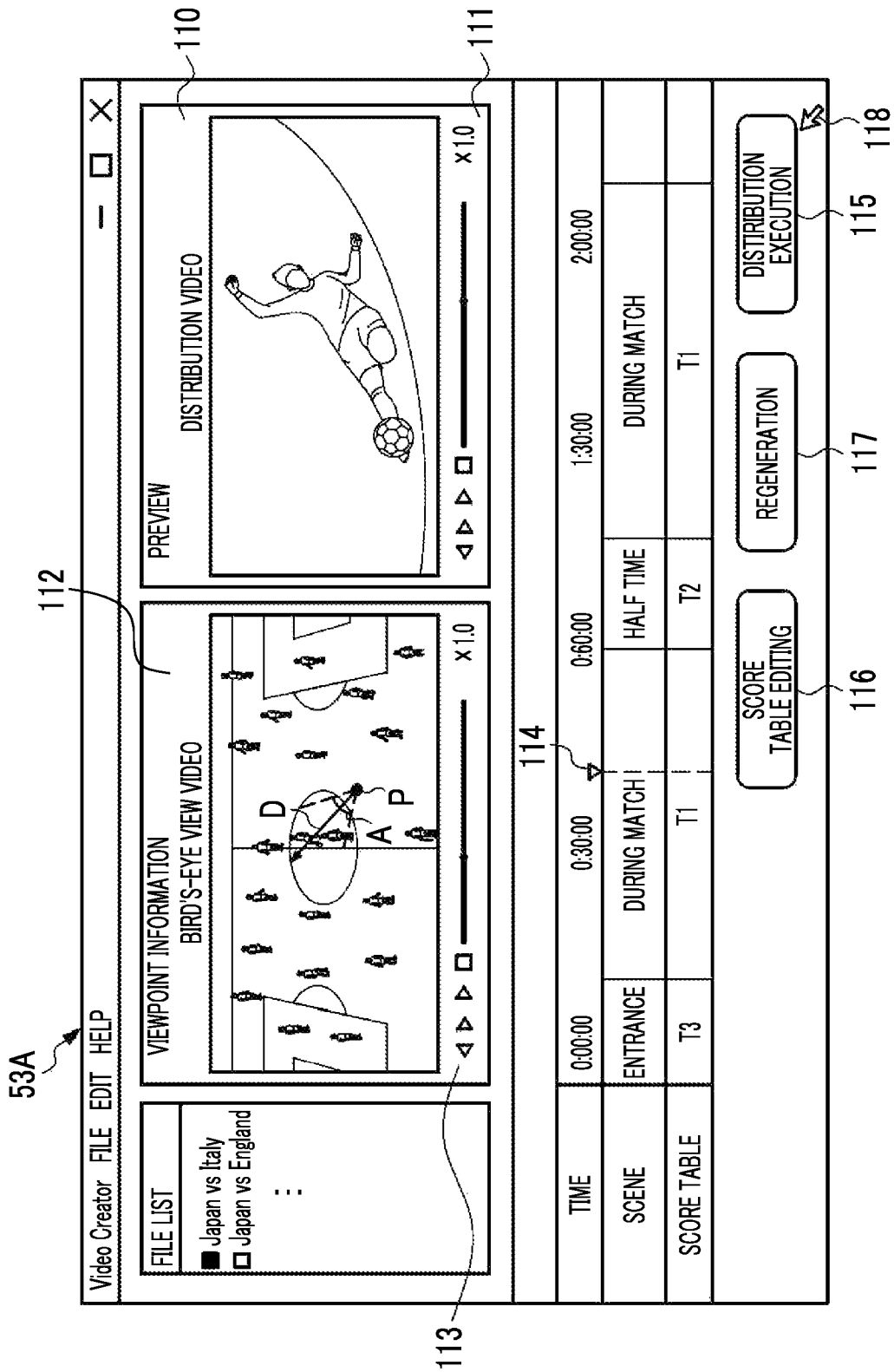
FIG. 15 is a conceptual diagram showing an example of a motion picture editing screen.

Further, as shown in FIG. 15 as an example, the distribution video generation unit 104 displays the generated distribution video on the motion picture editing screen 53A. The motion picture editing screen 53A is provided with a first display section 110 that is used to display a preview of the distribution video. In addition, the motion picture editing screen 53A is provided with a reproduction operation section 111 adjacent to the first display section 110. The user can perform the reproduction, the stop, the change of the reproduction speed, and the like of the distribution video by operating the reproduction operation section 111 using a mouse as an example of the reception device 52. The user causes the first display section 110 to display the preview of the distribution video, whereby the user can confirm the quality of the distribution video in advance before distributing the distribution video to the smart device 14, the receiver 34, and the like.

Similarly, the motion picture editing screen 53A is provided with a second display section 112 that is used to display the bird's-eye view video used for the scene determination processing. In addition, the motion picture editing screen 53A is provided with a reproduction operation section 113 adjacent to the second display section 112. The user can perform the reproduction, the stop, the change of the reproduction speed, and the like of the bird's-eye view video by operating the reproduction operation section 113 using the above mouse. For example, the viewpoint information including the line-of-sight direction D, the position P, and the angle of view A of the virtual viewpoint decided on the basis of the score table corresponding to the scene is displayed on the bird's-eye view video. The user can confirm the viewpoint information of the virtual viewpoint decided on the basis of the score table, through the second display section 112.

In addition, the scene determined by the scene determination unit 100 and the score table selected by the score table selection unit 101 are displayed on the motion picture editing screen 53A in association with each other. This makes it possible for the user to confirm whether or not an appropriate scene and score table are decided. Further, an indicator 114 indicating the reproduction position of the distribution video or the bird's-eye view video is displayed on the motion picture editing screen 53A. The indicator 114 indicates the reproduction position of the distribution video while the distribution video is reproduced on the first display section 110. Further, the indicator 114 indicates the reproduction position of the bird's-eye view video while the bird's-eye view video is reproduced on the second display section 112.

In addition, a distribution execution button 115, a score table editing button 116, and a regeneration button 117 are displayed on the motion picture editing screen 53A. The user can give an instruction to distribute the distribution video by performing a click operation in a state in which a cursor 118 displayed on the motion picture editing screen 53A is positioned on the distribution execution button 115 by the operation of the mouse. Further, the user can edit the score table by performing a click operation in a state in which the cursor 118 is positioned on the score table editing button 116 by the operation of the mouse.

Figure 16:
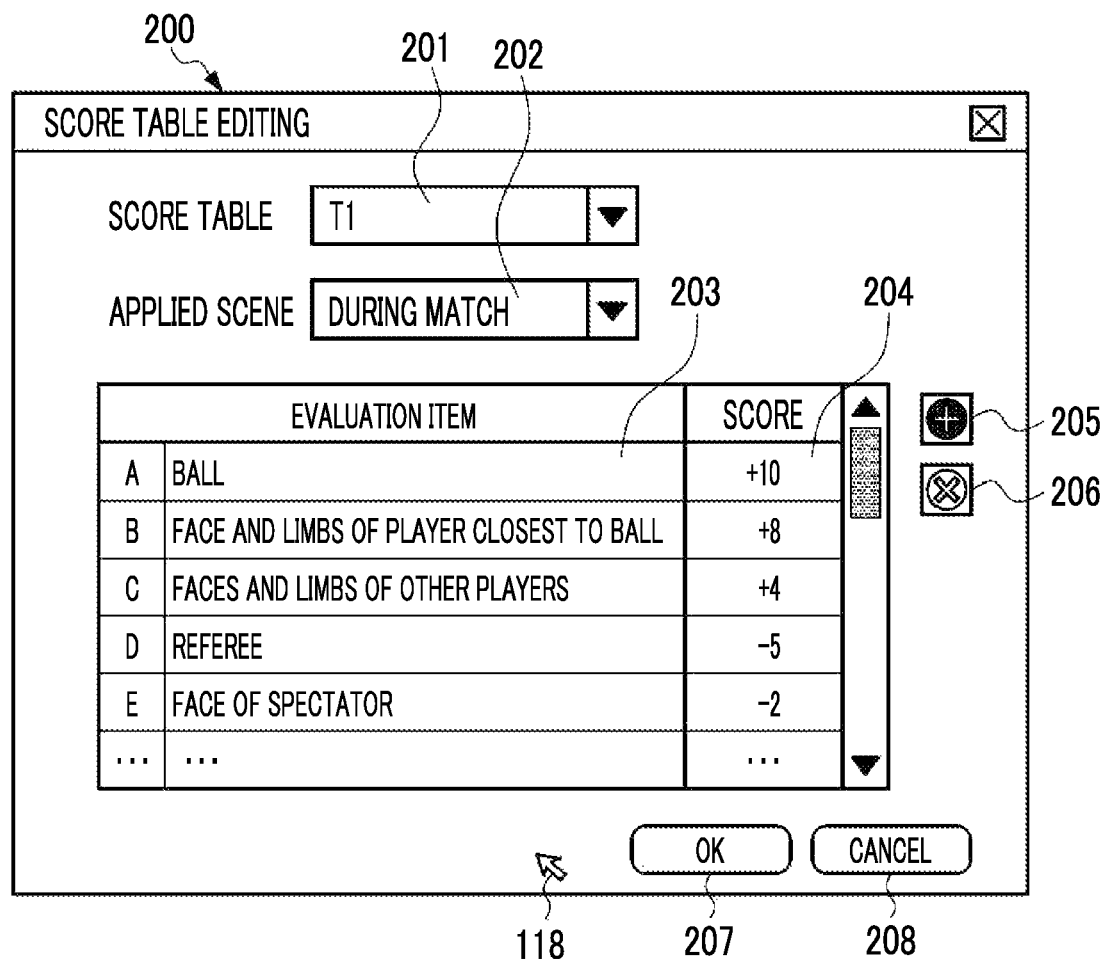
FIG. 16 is a conceptual diagram showing an example of a score table editing screen.

In the information processing apparatus 12, the control related to the editing of the score table is performed by the score table editing control unit 105. As shown in FIG. 16 as an example, the score table editing control unit 105 causes the display 53 to display GUIs of a score table editing screen 200. The score table editing control unit 105 causes the display 53 to display the score table editing screen 200 in response to a click operation on the score table editing button 116 on the motion picture editing screen 53A. A score table selection section 201, an applied scene selection section 202, an evaluation item setting section 203, and a score input section 204 are displayed on the score table editing screen 200.

The user can select a score table to be edited by operating the score table selection section 201 using a mouse or the like. In addition, the user can select a scene to be applied to the score table, which is selected in the score table selection section 201, by operating the applied scene selection section 202 using a mouse or the like. Further, the user can set an evaluation item suitable for the scene, which is selected in the applied scene selection section 202, by performing an input operation on the evaluation item setting section 203 using a mouse, a keyboard, or the like. Furthermore, the user can set a score corresponding to the evaluation item, which is set in the evaluation item setting section 203, by performing an input operation on the score input section 204 using a mouse, a keyboard, or the like.

Further, an evaluation item addition button 205, an evaluation item deletion button 206, an OK button 207, and a cancel button 208 are displayed on the score table editing screen 200. The user can add a new evaluation item by performing a click operation on the evaluation item addition button 205. Further, the user selects an evaluation item that has been set from the evaluation item setting section 203 and performs a click operation on the evaluation item deletion button 206, through the operation of the mouse, whereby the user can delete the corresponding evaluation item. Further, the user can settle the edited content of the score table by performing a click operation on the OK button 207. Furthermore, the user can cancel the edited content of the score table by performing a click operation on the cancel button 208.

In a case where the user settles the edited content of the score table by performing a click operation on the OK button 207, the score table editing control unit 105 generates a new score table to cause the storage 60 to store the generated new score table, and updates the correspondence table 106 used by the score table selection unit 101 (see FIG. 7). Further, the user can cause the information processing apparatus 12 to regenerate the distribution video on the basis of the updated score table by performing a click operation on the regeneration button 117.

Next, the operation of the information processing system 10 will be described.

Next, an example of the flow of the overall processing executed by the CPU 58 of the information processing apparatus 12 will be described with reference to FIG. 17.

Figure 17:
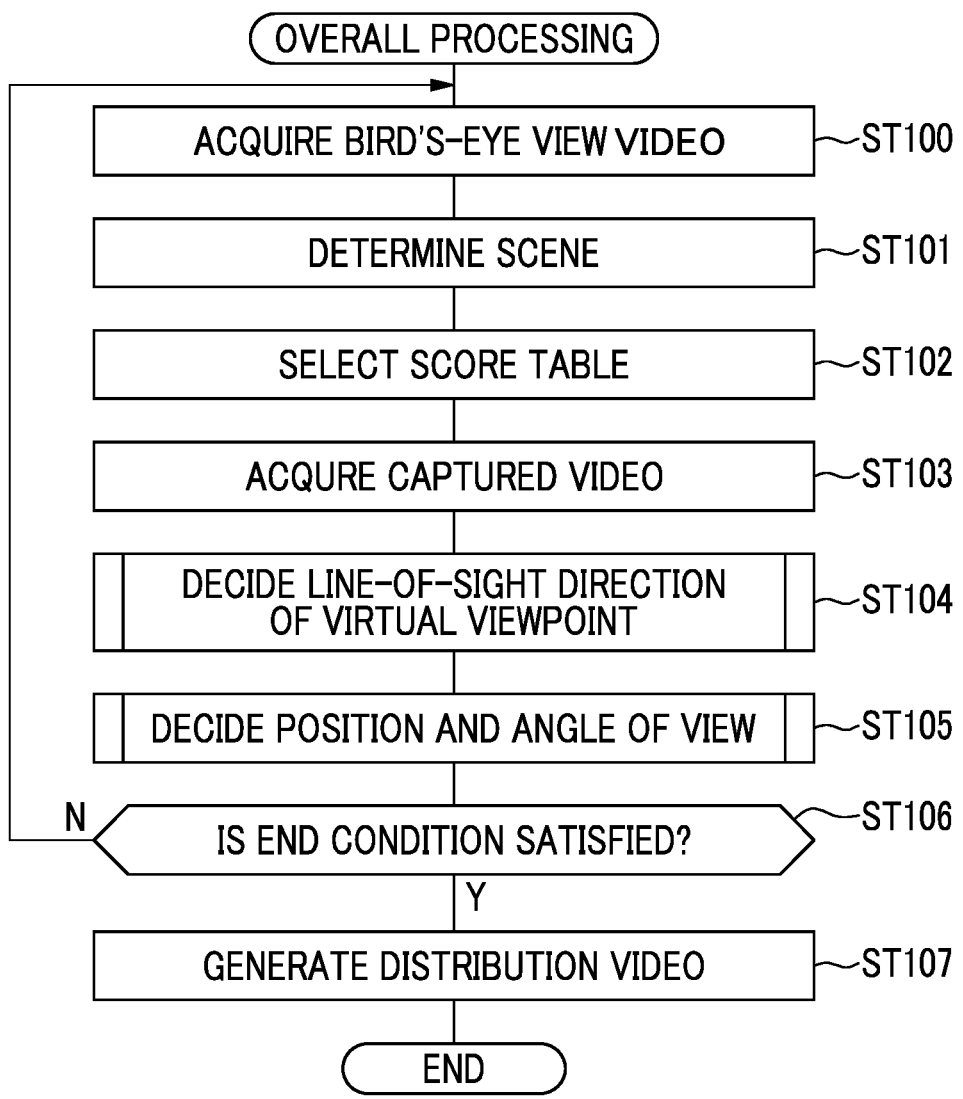
FIG. 17 is a flowchart showing an example of a flow of overall processing.

In the overall processing shown in FIG. 17, first, in step ST100, the scene determination unit 100 acquires the bird's-eye view video 46A from the imaging device 18 (see FIG. 6). In next step ST101, the scene determination unit 100 determines the scene shown by the bird's-eye view video 46A. In next step ST102, the score table selection unit 101 selects a score table corresponding to the scene determination result determined by the scene determination unit 100 by using the correspondence table 106 in which the scene and the score table are associated with each other. (see FIG. 7).

In next step ST103, the line-of-sight direction decision unit 102 acquires the captured video 46B from each of the plurality of imaging devices 16. In next step ST104, the line-of-sight direction decision unit 102 calculates the total score for each captured video 46B by using the score table selected by the score table selection unit 101. Then, the line-of-sight direction decision unit 102 decides the line-of-sight direction D of the virtual viewpoint by estimating the line-of-sight direction in which the total score is highest on the basis of the change related to the line-of-sight direction in the total score (see FIG. 10).

In next step ST105, the position and angle-of-view decision unit 103 decides the position and the angle of view of the virtual viewpoint on the basis of the distribution of the scores in the imaging target region by using, as a reference, the line-of-sight direction D of the virtual viewpoint decided by the line-of-sight direction decision unit 102 (see FIGS. 12 and 13).

In next step ST106, the CPU 58 determines whether or not the condition of ending the overall processing (hereinafter, referred to as an "end condition") is satisfied. Examples of the end condition include a condition that the imaging time of the plurality of captured videos 46B to be edited is passed. In step ST106, in a case where the end condition is not satisfied, a negative determination is made, and the overall processing proceeds to step ST100. In step ST106, in a case where the end condition is satisfied, an affirmative determination is made, and the overall processing proceeds to step ST107. That is, steps ST100 to ST105 are periodically repeated until the imaging time of the plurality of captured videos 46B to be edited is passed.

In step ST107, the distribution video generation unit 104 generates the virtual viewpoint video using the viewpoint information as a reference, on the basis of the viewpoint information decided by the position and angle-of-view decision unit 103 and the plurality of captured videos 46B. (see FIG. 14). The distribution video generation unit 104 generates the distribution video as motion picture data on the basis of the generated virtual viewpoint video. The distribution video generation unit 104 causes the storage 60 to store the generated distribution video.

Figure 18:
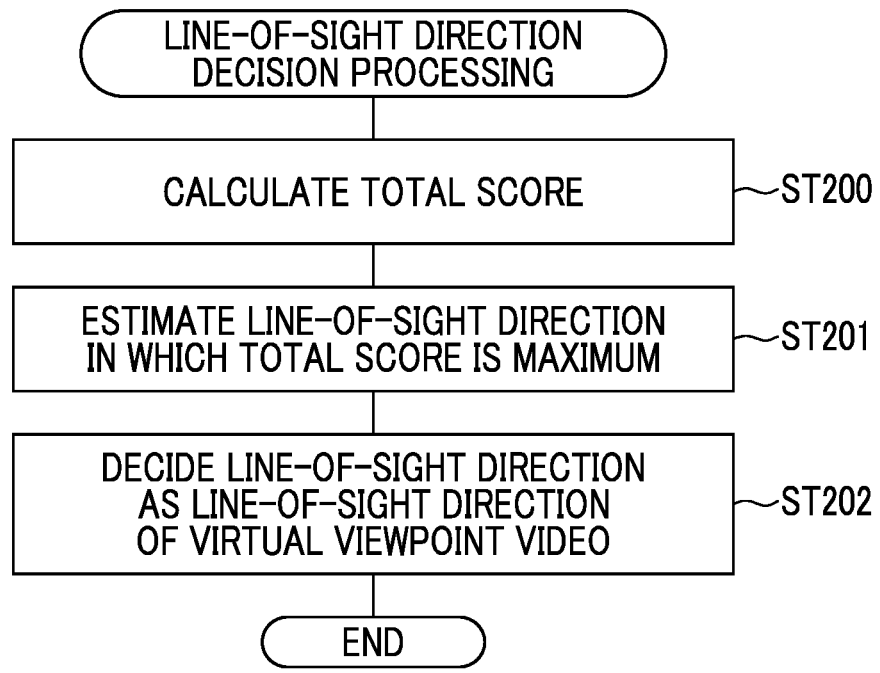
FIG. 18 is a flowchart showing an example of a flow of the line-of-sight direction decision processing.

Next, an example of the flow of the line-of-sight direction decision processing performed by the line-of-sight direction decision unit 102 in step ST104 will be described with reference to FIG. 18.

First, in step ST200, the line-of-sight direction decision unit 102 calculates the total score on the basis of the score table, for each of the plurality of captured videos 46B (see FIG. 11). In next step ST201, the line-of-sight direction decision unit 102 generates a interpolation curve indicating the relationship between the plurality of calculated total scores and the line-of-sight directions, and estimates the line-of-sight direction in which the total score is the maximum in the generated interpolation curve (see FIG. 10). In next step ST202, the line-of-sight direction decision unit 102 decides the line-of-sight direction in which the total score is the maximum, as the line-of-sight direction D of the virtual viewpoint.

Figure 19:
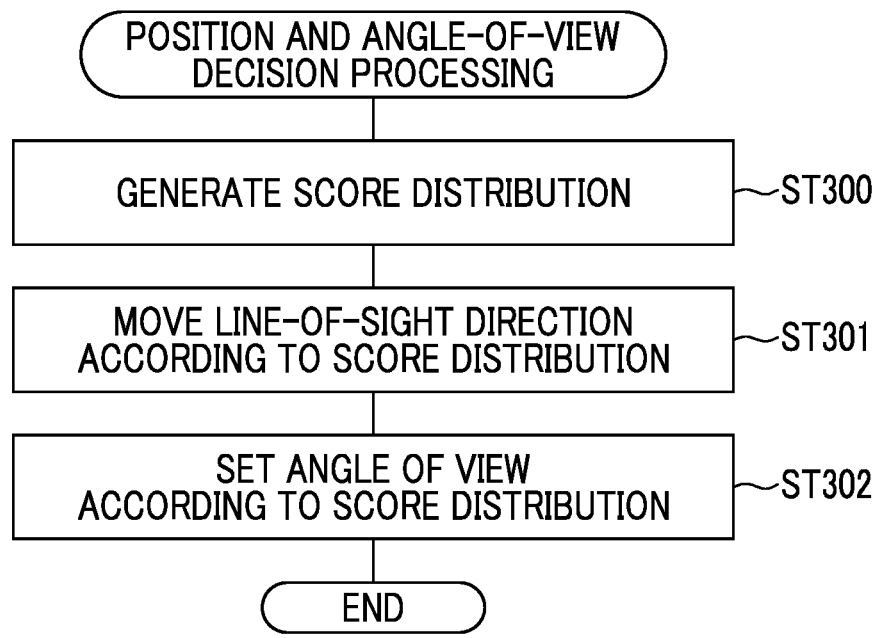
FIG. 19 is a flowchart showing an example of a flow of the position and angle-of-view decision processing.

Next, an example of the flow of the position and angle-of-view decision processing performed by the position and angle-of-view decision unit 103 in step ST105 will be described with reference to FIG. 19.

First, in step ST300, the position and angle-of-view decision unit 103 generates the score distribution in the imaging target region using, as a reference, the line-of-sight direction D decided by the line-of-sight direction decision unit 102 (see FIG. 12). In next step ST301, the position and angle-of-view decision unit 103 moves the line-of-sight direction D according to the score distribution. For example, the position and angle-of-view decision unit 103 moves the line-of-sight direction D in parallel such that the line-of-sight direction D is positioned in a region where the density of the scores is highest (see FIG. 13).

In next step ST302, the position and angle-of-view decision unit 103 decides the position P and the angle of view A of the virtual viewpoint according to the score distribution. For example, the position and angle-of-view decision unit 103 decides the angle of view A such that the density of the scores in the visual field region is highest (see FIG. 13).

As described above, in the information processing apparatus 12, the CPU 58 uses the plurality of images (the captured videos 46B in the above embodiment) obtained by imaging the imaging target region with the plurality of imaging devices 16 having different viewpoints, to evaluate the imaging target region from the plurality of line-of-sight directions on the basis of the one or more evaluation items. Then, the CPU 58 decides the line-of-sight direction of the virtual viewpoint, which is used to generate the virtual viewpoint video, on the basis of the evaluation result. Therefore, it is possible to decide the line-of-sight direction of the virtual viewpoint without taking time and effort.

Further, in the information processing apparatus 12, the CPU 58 decides the line-of-sight direction on the basis of the evaluation result obtained by calculating the evaluation value of the imaging target region as a numerical value. Therefore, it is possible to decide the line-of-sight direction of the virtual viewpoint without taking time and effort.

Further, in the information processing apparatus 12, the CPU 58 uses the score table in which a score is set for each evaluation item and the score is given in a case where a factor corresponding to the evaluation item exists. Then, the CPU 58 decides the line-of-sight direction in which the total score of the scores is highest for the imaging target region, as the line-of-sight direction of the virtual viewpoint. Therefore, it is possible to decide the line-of-sight direction of the virtual viewpoint without taking time and effort.

Further, in the information processing apparatus 12, the CPU 58 decides the line-of-sight direction of the virtual viewpoint by estimating the line-of-sight direction in which the total score is highest, on the basis of the change related to the line-of-sight direction in the total score calculated for each of the plurality of images. Therefore, it is possible to decide the line-of-sight direction of the virtual viewpoint by using only a plurality of real images acquired by the imaging device, so that the processing of deciding the line-of-sight direction can be shortened.

Further, in the information processing apparatus 12, the CPU 58 decides the position and the angle of view of the virtual viewpoint on the basis of the distribution of the scores in the imaging target region by using the line-of-sight direction of the virtual viewpoint as a reference after deciding the line-of-sight direction of the virtual viewpoint. Therefore, it is possible to decide the position and the angle of view of the virtual viewpoint, in addition to the line-of-sight direction of the virtual viewpoint, without taking time and effort.

Further, in the information processing apparatus 12, the CPU 58 decides the position and the angle of view of the virtual viewpoint by using, as a reference, the region where the density of the scores is highest in the imaging target region. Therefore, it is possible to accurately decide the position and the angle of view of the virtual viewpoint.

Further, in the information processing apparatus 12, the CPU 58 switches a plurality of the score tables in which at least one of the evaluation item or the score is different, and decides the line-of-sight direction of the virtual viewpoint by using the switched score table. Therefore, it is possible to decide the virtual viewpoint on the basis of various score tables.

Further, in the information processing apparatus 12, the CPU 58 performs the scene determination processing, and switches the score table according to the scene of the imaging target region. Therefore, it is possible to decide the optimum virtual viewpoint according to the scene.

Further, in the information processing apparatus 12, the CPU 58 periodically decides the line-of-sight direction, the position, and the angle of view of the virtual viewpoint. Therefore, it is possible to periodically update the virtual viewpoint, and to change the virtual viewpoint according to the state change in the imaging target region.

Further, in the information processing apparatus 12, the CPU 58 generates the virtual viewpoint video on the basis of the virtual viewpoint information including the decided line-of-sight direction of the virtual viewpoint. Therefore, it is possible to generate the virtual viewpoint video without taking time and effort.

In the above embodiment, although the CPU 58 decides the virtual viewpoint on the basis of the plurality of images and the score table, there is a probability that the decided virtual viewpoint may match any of the viewpoints of the plurality of imaging devices 16. The image quality of the virtual viewpoint video generated with the virtual viewpoint as a reference is different from the image quality of the captured video 46B obtained by the imaging device 16. Therefore, in a case where the distribution video is switched from the virtual viewpoint video to the captured video 46B when the decided virtual viewpoint matches any of the viewpoints of the plurality of imaging devices 16, there is a probability that discomfort may be given to the viewer.

Figure 20:
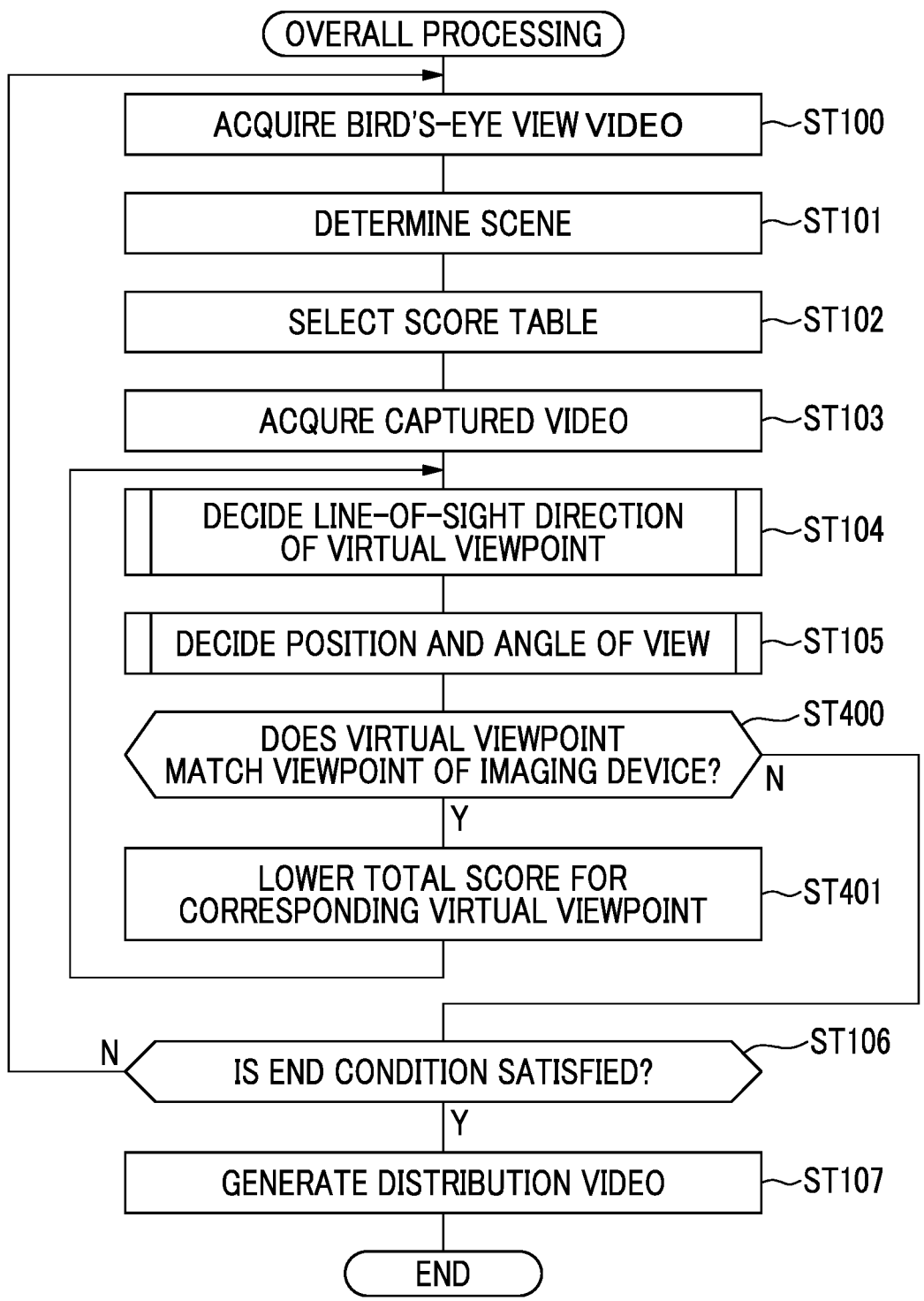
FIG. 20 is a flowchart showing a modification example of the overall processing.

In that respect, in a case where any of the viewpoints of the plurality of imaging devices matches the virtual viewpoint, the CPU 58 may lower the score for the corresponding virtual viewpoint to restrain the corresponding virtual viewpoint from being decided. In this case, the CPU 58 performs overall processing shown in FIG. 20 as an example. The overall processing shown in FIG. 20 is different from the overall processing shown in FIG. 17 only in that steps ST400 and ST401 are added between steps ST105 and ST106.

The CPU 58 decides the position and the angle of view of the virtual viewpoint in step ST105, and then determines whether or not a condition that the decided virtual viewpoint matches any of the viewpoints of the plurality of imaging devices 16 (hereinafter, referred to as a "matching condition") is satisfied in step ST400. Examples of the matching condition include a condition that the line-of-sight direction, the position, and the angle of view of the virtual viewpoint match the line-of-sight direction, the position, and the angle of view of the viewpoint of the imaging device 16.

In step ST400, in a case where the matching condition is not satisfied, a negative determination is made, and the overall processing proceeds to step ST106. In step ST400, in a case where the matching condition is satisfied, an affirmative determination is made, and the overall processing proceeds to step ST401. In step ST401, the CPU 58 lowers the total score for the virtual viewpoint that matches any of the viewpoints of the plurality of imaging devices 16, and then causes the overall processing to proceed to step ST104.

In step ST104, the line-of-sight direction decision unit 102 decides the line-of-sight direction of the virtual viewpoint again on the basis of the total score. However, since the total score of the virtual viewpoint that matches any of the viewpoints of the plurality of imaging devices 16 is lowered in step ST401, the corresponding line-of-sight direction of the virtual viewpoint is restrained from being decided again in step ST104. In this way, it is possible to restrain the discomfort given to the viewer, which is caused by deciding the virtual viewpoint that matches the viewpoint of the imaging device 16.

Further, in the above embodiment, although the CPU 58 selects a score table according to the scene through the score table selection section 201, there is a probability that the viewer may get bored because the temporal change of the decided virtual viewpoint is small in a case where one score table is continuously selected. Therefore, the CPU 58 may perform processing of switching the score table on a condition that a predetermined time is passed after the score table is selected through the score table selection section 201. In this way, the score table is switched on a condition that the predetermined time is passed after the score table is switched so that the temporal change of the virtual viewpoint becomes large, whereby it is possible to restrain the viewer from getting bored.

Figure 21:
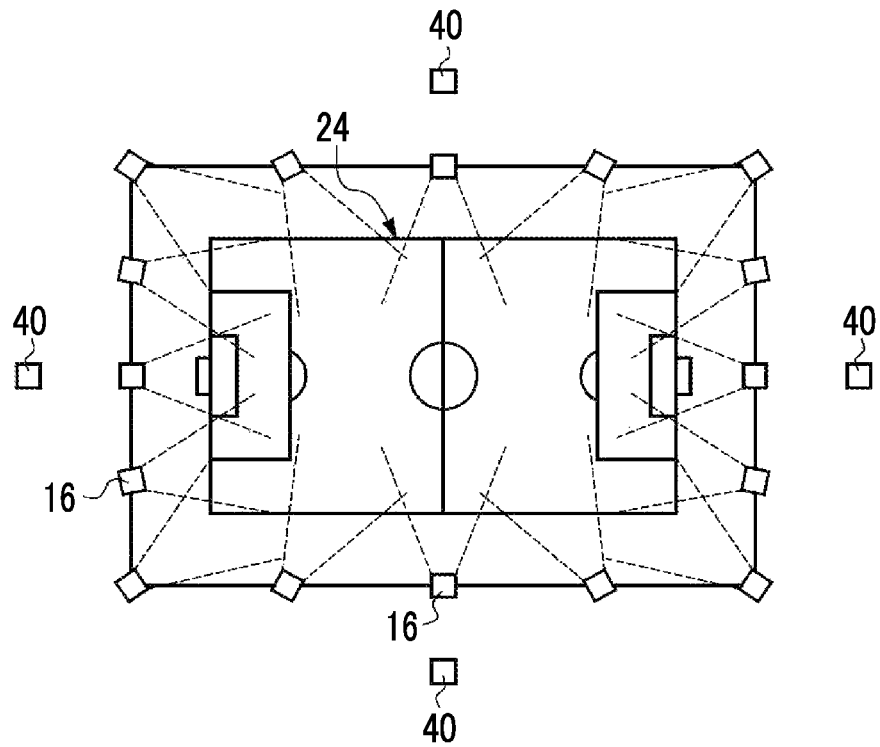
FIG. 21 is a conceptual diagram used to illustrate an example of disposition of a microphone.

Further, in the above embodiment, the evaluation item includes the type of the object included in the imaging target region. Therefore, the virtual viewpoint can be decided according to the type of the object. The evaluation item is not limited to the type of the object, and may be an item other than the object. As an example, the type of sound information collected by a microphone installed in or near the imaging target region may be included in the evaluation item. As shown in FIG. 21 as an example, microphones 40 disposed around the soccer field 24 may collect the cheers of the spectators, the sound of the whistle blown by the referee, and the like. In this case, the CPU 58 sets types such as the cheers of the spectators or the sound of the whistle blown by the referee, as the evaluation item. In this way, the CPU 58 can decide the virtual viewpoint by using, for example, sound information other than the object.

Further, in a case where the microphone 40 is provided, the sound information collected by the microphone 40 can be used for the scene determination processing. In this case, for example, the scene determination unit 100 determines the scene on the basis of the sound information collected by the microphone 40 and the bird's-eye view video 46A. With this, the accuracy of scene determination performed by the scene determination unit 100 is improved.

Further, in the above embodiment, the CPU 58 periodically decides the virtual viewpoint by using the score table through the line-of-sight direction decision unit 102 and the position and angle-of-view decision unit 103. However, there is a probability that the decided line-of-sight direction, position, or angle of view of the virtual viewpoint may be significantly different from the line-of-sight direction, the position, or the angle of view of a virtual viewpoint group decided in the past, even in a case where the same score table is used. In this way, in a case where a virtual viewpoint having a line-of-sight direction, a position, or an angle of view that is significantly different from the line-of-sight direction, the position, or the angle of view of the history of the virtual viewpoint group decided in the past is decided, discomfort may be given to the viewer.

Figure 22:
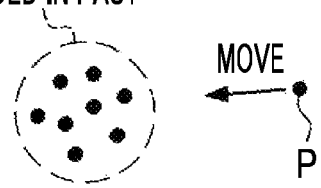
FIG. 22 is a conceptual diagram used to illustrate an example of processing of deciding a virtual viewpoint by referring to history information of the virtual viewpoint decided in the past.

In that respect, in a case where the virtual viewpoint is decided by the line-of-sight direction decision unit 102 and the position and angle-of-view decision unit 103, the CPU 58 may decide the line-of-sight direction, the position, and the angle of view of the virtual viewpoint by referring to the history information of the virtual viewpoint group decided in the past. As shown in FIG. 22 as an example, in a case where the virtual viewpoint is decided by the line-of-sight direction decision unit 102 and the position and angle-of-view decision unit 103, the CPU 58 determines whether or not the position P of the virtual viewpoint decided this time is separated by a threshold value or more by referring to the position of the virtual viewpoint decided in the past. In a case where the position is separated by the threshold value or more, the position P of the virtual viewpoint is made close to the position of the virtual viewpoint group decided in the past. The same applies to the line-of-sight direction and the angle of view. With this, it is possible to restrain the virtual viewpoint that is significantly different from the viewpoint of the past history from being decided, and to restrain the discomfort given to the viewer.

Figure 23:
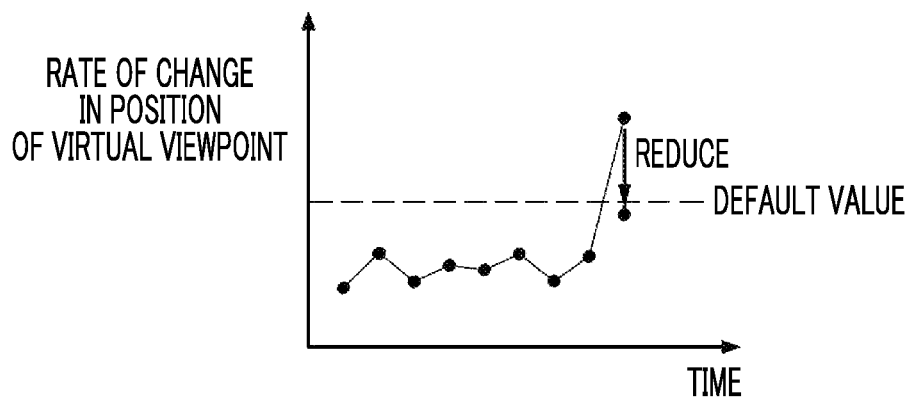
FIG. 23 is a conceptual diagram used to illustrate an example of processing of deciding the virtual viewpoint on the basis of a temporal change of the virtual viewpoint.

Further, the CPU 58 may decide the line-of-sight direction, the position, and the angle of view of the virtual viewpoint under the restriction that a rate of temporal change in each of the line-of-sight direction, the position, and the angle of view of the virtual viewpoint is a default value or less. As shown in FIG. 23 as an example, the CPU 58 monitors the rate of change in the position of the virtual viewpoint decided by the line-of-sight direction decision unit 102 and the position and angle-of-view decision unit 103. The CPU 58 reduces the rate of change in the position of the virtual viewpoint to the default value or less in a case where the rate of change in the position of the virtual viewpoint exceeds the default value. The same applies to the line-of-sight direction and the angle of view. With this, it is possible to restrain the discomfort given to the viewer due to the change in the line-of-sight direction, the position, and the angle of view of the virtual viewpoint.

Figure 24:
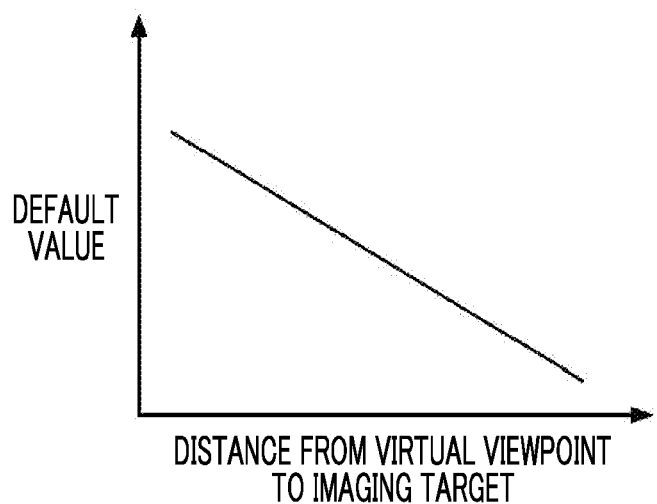
FIG. 24 is a conceptual diagram used to illustrate an example in which a default value is decided according to a distance from the virtual viewpoint to an imaging target.

The default value shown in FIG. 23 may not be necessarily a fixed value. The default value may be a value decided according to the distance from the virtual viewpoint to the imaging target. As shown in FIG. 24 as an example, the CPU 58 may make the default value smaller as the distance from the virtual viewpoint to the imaging target increases. This is because the viewer is less conscious of the temporal change in each of the line-of-sight direction, the position, and the angle of view of the virtual viewpoint as the distance from the virtual viewpoint to the imaging target increases. With this, it is possible to restrain the discomfort given to the viewer due to the change in the line-of-sight direction, the position, and the angle of view of the virtual viewpoint.

Further, in the above embodiment, the CPU 58 calculates, through the line-of-sight direction decision unit 102, the total score for each of the plurality of captured videos 46B (that is, the plurality of real images), which is obtained by the plurality of imaging devices 16, having different line-of-sight directions. The technique of the present disclosure is not limited thereto, and the CPU 58 may calculate the score for each virtual viewpoint video through the line-of-sight direction decision unit 102 after generating the virtual viewpoint videos having different line-of-sight directions.

The soccer stadium 22 has been described as an example in the above embodiment, but the soccer stadium 22 is merely an example, and any place may be used as long as a plurality of imaging devices can be installed as in a baseball field, a rugby field, a curling field, an athletic field, a swimming field, a concert hall, an outdoor music field, a theater venue, and the like.

Further, the wireless communication method using the base station 20 has been described as an example in the above embodiment, but the wireless communication method is merely an example, and the technique of the present disclosure is established even with the wired communication method using a cable.

Further, the unmanned aerial vehicle 27 has been described as an example in the above embodiment, but the technique of the present disclosure is not limited thereto, and the imaging target region may be imaged by the imaging device 18 suspended by a wire (for example, a self-propelled imaging device that is movable along the wire).

Further, the computers 50 and 70 have been described as an example in the above embodiment, but the technique of the present disclosure is not limited thereto. For example, a device including an ASIC, an FPGA, and/or a PLD may be applied instead of the computers 50 and/or 70. Alternatively, a combination of a hardware configuration and a software configuration may be used instead of the computers 50 and/or 70.

Figure 25:
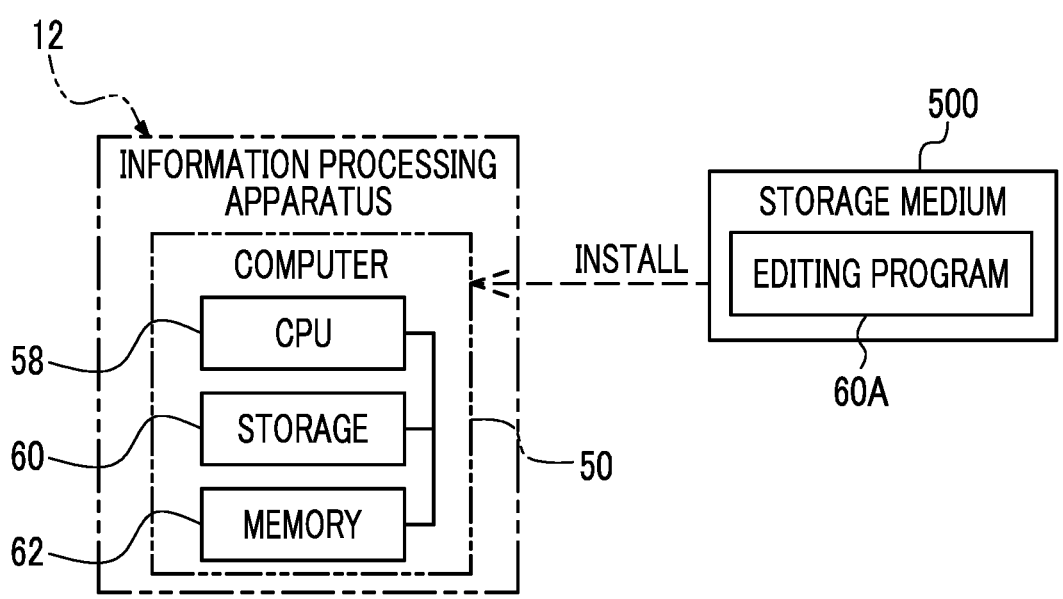
FIG. 25 is a block diagram showing an example of an aspect in which a program is installed from a storage medium onto a computer of the information processing apparatus.

Further, the storage 60 stores the editing program 60A in the above embodiment, but the technique of the present disclosure is not limited thereto, and any portable storage medium 500, such as an SSD or a USB memory, may store the editing program 60A as shown in FIG. 25 as an example. In this case, the editing program 60A stored in the storage medium 500 is installed on the computer 50, and the CPU 58 executes information processing (for example, scene determination processing, score table selection processing, line-of-sight direction decision processing, position and angle-of-view decision processing, and distribution video generation processing) in accordance with the editing program 60A.

Alternatively, the editing program 60A may be stored in a storage unit of, for example, another computer or a server device connected to the computer 50 through the communication network (not shown), and the editing program 60A may be downloaded on the information processing apparatus 12 in response to a request from the information processing apparatus 12. In this case, information processing based on the downloaded editing program 60A is executed by the CPU 58 of the computer 50.

Further, the CPU 58 has been described as an example in the above embodiment, but the technique of the present disclosure is not limited thereto, and a GPU may be adopted. Alternatively, a plurality of CPUs or a combination of a CPU and a GPU may be adopted instead of the CPU 58. That is, the information processing may be executed by one processor or a plurality of physically separated processors. Further, a GPU may be adopted instead of the CPU 88, or a plurality of CPUs or a combination of a CPU and a GPU may be adopted, or various kinds of processing may be executed by one processor or a plurality of physically separated processors.

As a hardware resource for executing the information processing, various processors shown below can be used. Examples of the processor include, as described above, a CPU, which is a general-purpose processor that functions as the hardware resource for executing the information processing in accordance with software, that is, the program. Examples of another processor include a dedicated electric circuit, which is a processor having a dedicated circuit configuration designed to execute specific processing, such as an FPGA, a PLD, or an ASIC. A memory is incorporated in or connected to every processor, and every processor uses the memory to execute the information processing.

The hardware resource for executing the information processing may be constituted of one of these various processors, or a combination of two or more processors of the same type or different types (for example, a combination of a plurality of FPGAs, or a combination of a CPU and an FPGA). Alternatively, the hardware resource for executing the information processing may be one processor.

A first example in which the hardware resource for executing the information processing is constituted of one processor is an aspect in which one or more CPUs and software are combined to constitute one processor and the processor functions as the hardware resource for executing the information processing. The aspect is typified by a computer such as a client and a server. A second example is an aspect in which a processor that realizes all the functions of a system including a plurality of hardware resources for executing the information processing with one IC chip is used. The aspect is typified by an SoC or the like. As described above, the information processing is realized by using one or more of the above-described various processors as a hardware resource.

Furthermore, more specifically, electric circuitry in which circuit elements such as semiconductor elements are combined can be used as the hardware structure of these various processors. Furthermore, the technique of the present disclosure extends to a program and a storage medium on which the program is stored in a non-transitory manner.

In addition, the above-mentioned information processing is merely an example. Accordingly, it goes without saying that unnecessary steps may be deleted, new steps may be added, or the processing order may be rearranged without departing from the gist.

The contents described and shown above are detailed descriptions for parts related to the technique of the present disclosure, and are merely an example of the technique of the present disclosure. For example, the description of the configurations, functions, operations, and effects is the description of an example of the configurations, functions, operations, and effects of parts related to the technique of the present disclosure. Therefore, it goes without saying that unnecessary elements may be deleted, new elements may be added, or the replacements may be made for the contents described and shown above without departing from the gist of the technique of the present disclosure. In addition, in order to avoid complications and facilitate understanding of the parts related to the technique of the present disclosure, in the contents described and shown above, descriptions of common general knowledge and the like that do not require special descriptions for enabling the implementation of the technique of the present disclosure are omitted.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An information processing apparatus comprising:
 a processor; and
 a memory that is connected to or incorporated in the processor,
 wherein the processor is configured to:
 generate evaluation results by evaluating a single imaging target region with respect to each of a plurality of line-of-sight directions on the basis of one or more evaluation items by using a plurality of images obtained by imaging the single imaging target region from the plurality of line-of-sight directions with a plurality of imaging devices having different viewpoints, and
 decide a line-of-sight direction of a virtual viewpoint, which is used to generate a virtual viewpoint video of the single imaging target region, on the basis of a relationship between the evaluation results and the plurality of line-of-sight directions,
 wherein the evaluation results are obtained by calculating evaluation values of the single imaging target region as numerical values in a score table in which a score is set for each evaluation item and the score is given in a case where a factor corresponding to the evaluation item exists.

2. The information processing apparatus according to claim 1, wherein the processor is configured to:
 decide a line-of-sight direction in which a total score of the scores is highest for the single imaging target region, as the line-of-sight direction of the virtual viewpoint.

3. The information processing apparatus according to claim 2, wherein the processor is configured to:
 decide the line-of-sight direction of the virtual viewpoint by estimating the line-of-sight direction in which the total score is highest, on the basis of a change related to the line-of-sight direction in the total score calculated for each of the plurality of images.

4. The information processing apparatus according to claim 3, wherein the processor is configured to:
 decide a position and an angle of view of the virtual viewpoint on the basis of distribution of the scores in the single imaging target region by using the line-of-sight direction of the virtual viewpoint as a reference after deciding the line-of-sight direction of the virtual viewpoint.

5. The information processing apparatus according to claim 4, wherein the processor is configured to:
 decide the position and the angle of view of the virtual viewpoint by using, as a reference, a region where density of the scores is highest in the single imaging target region.

6. The information processing apparatus according to claim 5, wherein the processor is configured to:
 lower the score in a case where any of the viewpoints of the plurality of imaging devices matches the virtual viewpoint.

7. The information processing apparatus according to claim 2, wherein the processor is configured to:
 switch a plurality of the score tables in which at least one of the evaluation item or the score is different, and decide the line-of-sight direction of the virtual viewpoint by using the switched score table.

8. The information processing apparatus according to claim 7, wherein the processor is configured to:
 switch the score table according to a scene of the single imaging target region.

9. The information processing apparatus according to claim 7, wherein the processor is configured to:
 switch the score table on a condition that a predetermined time is passed after the score table is switched.

10. The information processing apparatus according to claim 1,
 wherein the evaluation item includes a type of an object included in the single imaging target region.

11. The information processing apparatus according to claim 10,
 wherein the evaluation item includes a type of sound information collected by a microphone.

12. The information processing apparatus according to claim 4, wherein the processor is configured to:
 decide the line-of-sight direction, the position, and the angle of view by referring to history information of the virtual viewpoint decided in a past.

13. The information processing apparatus according to claim 4, wherein the processor is configured to:
 periodically decide the line-of-sight direction, the position, and the angle of view of the virtual viewpoint.

14. The information processing apparatus according to claim 13, wherein the processor is configured to:
 decide the line-of-sight direction, the position, and the angle of view of the virtual viewpoint under restriction that a rate of temporal change in each of the line-ofsight direction, the position, and the angle of view of the virtual viewpoint is a default value or less.

15. The information processing apparatus according to claim 14,
wherein the default value is decided according to a distance from the virtual viewpoint to an imaging target.

16. The information processing apparatus according to claim 1, wherein the processor is configured to generate the virtual viewpoint video on the basis of virtual viewpoint information including the decided line-of-sight direction of the virtual viewpoint.

17. An information processing method comprising:
generating evaluation results by evaluating a single imaging target region with respect to each of a plurality of line-of-sight directions on the basis of one or more evaluation items by using a plurality of images obtained by imaging the single imaging target region from the plurality of line-of-sight directions with a plurality of imaging devices having different viewpoints; and
deciding a line-of-sight direction of a virtual viewpoint, which is used to generate a virtual viewpoint video of the single imaging target region, on the basis of a relationship between the evaluation results and the plurality of line-of-sight directions,
wherein the evaluation results are obtained by calculating evaluation values of the single imaging target region as numerical values in a score table in which a score is set for each evaluation item and the score is given in a case where a factor corresponding to the evaluation item exists.

18. A non-transitory computer-readable storage medium storing a program for causing a computer to execute a process comprising:
generating evaluation results by evaluating a single imaging target region with respect to each of a plurality of line-of-sight directions on the basis of one or more evaluation items by using a plurality of images obtained by imaging the single imaging target region from the plurality of line-of-sight directions with a plurality of imaging devices having different viewpoints; and
deciding a line-of-sight direction of a virtual viewpoint, which is used to generate a virtual viewpoint video of the single imaging target region, on the basis of a relationship between the evaluation results and the plurality of line-of-sight directions,
wherein the evaluation results are obtained by calculating evaluation values of the single imaging target region as numerical values in a score table in which a score is set for each evaluation item and the score is given in a case where a factor corresponding to the evaluation item exists.

19. The information processing apparatus according to claim 3, wherein the processor is configured to:
generate an interpolation curve indicating the relationship between the plurality of calculated total scores and the plurality of line-of-sight directions, and estimate the line-of-sight direction in which the total score is highest in the generated interpolation curve.

* * * * *